United States Patent
Kawarai et al.

(10) Patent No.: US 8,217,296 B2
(45) Date of Patent: Jul. 10, 2012

(54) FLUID-QUALITY CONTROL METHOD, FLUID-QUALITY CONTROL APPARATUS, AND ELECTRIC-DISCHARGE MACHINING APPARATUS EMPLOYING THE SAME

(75) Inventors: Hisakatsu Kawarai, Chiyoda-ku (JP); Shuuichiro Ishihara, Chiyoda-ku (JP); Yooji Nakajima, Chiyoda-ku (JP); Hisashi Yamada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1193 days.

(21) Appl. No.: 11/997,881

(22) PCT Filed: Apr. 5, 2006

(86) PCT No.: PCT/JP2006/307251
§ 371 (c)(1),
(2), (4) Date: Feb. 4, 2008

(87) PCT Pub. No.: WO2007/113915
PCT Pub. Date: Oct. 11, 2007

(65) Prior Publication Data
US 2010/0219164 A1    Sep. 2, 2010

(51) Int. Cl.
*B23H 1/10* (2006.01)
*C02F 1/42* (2006.01)
(52) U.S. Cl. ............... 219/69.14; 210/685; 219/69.17
(58) Field of Classification Search ............... 219/69.13, 219/69.14, 69.17; 210/638, 639, 662, 685, 210/739, 743, 85, 96.1, 259, 264, 266, 284, 210/290; 451/36, 60, 446; 205/650, 685, 205/686
See application file for complete search history.

(56) References Cited

U.S. PATENT DOCUMENTS

| | | | |
|---|---|---|---|
| 4,584,450 A | | 4/1986 | Inoue |
| 4,622,133 A | * | 11/1986 | Furuno .................... 210/662 |
| 4,917,806 A | * | 4/1990 | Matsunaga et al. ........... 210/662 |
| 5,028,758 A | * | 7/1991 | Hori et al. .................. 219/69.14 |
| 5,643,797 A | * | 7/1997 | Schmidt et al. ............... 210/743 |
| 7,737,380 B2 | * | 6/2010 | Kawarai et al. ............. 219/69.14 |
| 2003/0080063 A1 | * | 5/2003 | Kim et al. ..................... 210/662 |
| 2004/0238457 A1 | * | 12/2004 | Castrillo et al. .............. 210/748 |

FOREIGN PATENT DOCUMENTS

DE  2851482 A1  5/1979
DE  112005002782 T5  3/2008
(Continued)

OTHER PUBLICATIONS

Korean Notice of Allowance dated Jun. 1, 2011 issued in counterpart Korean Application No. 10-2007-7028529.

*Primary Examiner* — Geoffrey S Evans
(74) *Attorney, Agent, or Firm* — Sughrue Mion, PLLC

(57) ABSTRACT

Target fluid is made into electrolyte solution when measured fluid-quality value is lower than a first condition value, by substituting an impurity anion contained in the target fluid with a predetermined anion and substituting an impurity cation contained in the target fluid with a predetermined cation, and purified when the fluid-quality value is higher than a second condition value. The above procedures are repeated, so that the fluid-quality value of the target fluid falls within a predetermined range, to make the target fluid into electrolyte solution with a correlation between pH and conductivity.

23 Claims, 12 Drawing Sheets

FOREIGN PATENT DOCUMENTS

| | | | |
|---|---|---|---|
| JP | 57205027 A | 12/1982 | |
| JP | 63-191514 A | * | 8/1988 |
| JP | 63191514 A | 8/1988 | |
| JP | 1164489 A | 6/1989 | |
| JP | 4141319 A | 5/1992 | |
| JP | 04141319 A | 5/1992 | |
| JP | 4141320 A | 5/1992 | |
| JP | 05042414 A | 2/1993 | |
| JP | 71415491 A | 6/1995 | |
| JP | 8009030 B2 | 1/1996 | |
| JP | 2002301624 A | 10/2002 | |
| WO | WO 2006-126248 A1 | 11/2006 | |

* cited by examiner

| pH | ELECTROLYTE SOLUTIONIZING UNIT | PURIFYING UNIT |
|---|---|---|
| HIGHER THAN CONDITION VALUE | STOP | OPERATE |
| LOWER THAN CONDITION VALUE | OPERATE | STOP |

| UNDER MACHINING/ NOT UNDER MACHINING | pH | ELECTROLYTE SOLUTIONIZING UNIT | PURIFYING UNIT | OH⁻ FORMING UNIT |
|---|---|---|---|---|
| UNDER MACHINING/ NOT UNDER MACHINING | HIGHER THAN CONDITION VALUE | STOP | OPERATE | STOP |
| UNDER MACHINING | LOWER THAN CONDITION VALUE | OPERATE | STOP | STOP |
| NOT UNDER MACHINING | LOWER THAN CONDITION VALUE | STOP | STOP | OPERATE |

| UNDER MACHINING/ NOT UNDER MACHINING | pH | ELECTROLYTE SOLUTIONIZING UNIT | PURIFYING UNIT | ELECTROLYTIC-WATER PRODUCING UNIT |
|---|---|---|---|---|
| UNDER MACHINING/ NOT UNDER MACHINING | HIGHER THAN CONDITION VALUE | STOP | OPERATE | STOP |
| UNDER MACHINING | LOWER THAN CONDITION VALUE | OPERATE | STOP | OPERATE |
| NOT UNDER MACHINING | LOWER THAN CONDITION VALUE | STOP | STOP | OPERATE |

FLUID-QUALITY CONTROL METHOD, FLUID-QUALITY CONTROL APPARATUS, AND ELECTRIC-DISCHARGE MACHINING APPARATUS EMPLOYING THE SAME

CROSS REFERENCE TO RELATED APPLICATIONS

This application is a National Stage of International Application No. PCT/JP2006/307251 filed Apr. 5, 2006, the contents of all of which are incorporated herein by reference in its entirety.

TECHNICAL FIELD

The present invention relates to a fluid-quality control method for controlling a fluid quality of a used water-containing machining fluid used in electric-discharge machining or a fluid quality of an undiluted fluid that is a material for the water-containing machining fluid used in the electric-discharge machining, and for thereby preparing the water-containing machining fluid for the electric-discharge machining, a fluid-quality control apparatus based on this method, and a discharge machining apparatus using the fluid-quality control apparatus.

BACKGROUND ART

In an electric-discharge machining apparatus such as a wire electric-discharge machining apparatus or a die sinking electric-discharge machining apparatus employed in precision machining such as mold machining, a high frequency pulsed voltage is applied to a machining electrode and a workpiece while a machining fluid interposes between the machining electrode and the workpiece. In addition, the workpiece is engraved very little by very little by an electric discharge generated by application of this voltage, thereby forming the workpiece into a desired shape.

Types of the machining fluid used in this electric-discharge machining apparatus can be roughly grouped into an insulating oil-containing machining fluid and water-containing machining fluid. Since the water-containing machining fluid is higher in cooling capability than the insulating oil-containing machining fluid, the water-containing machining fluid tends to easily accelerate a machining speed of the apparatus. Whether the water-containing machining fluid or the insulating oil-containing machining fluid, the machining fluid is normally recycled without being disposed of. However, once the machining fluid is used, the machining fluid contains metallic ions produced from the machining electrode and the workpiece or atmospheric components. As a result, a fluid quality differs between the unused machining fluid and the used machining fluid.

It is desirable to stabilize discharge conditions for the electric discharge generated between the machining electrode and the workpiece as much as possible to maintain high machining accuracy of the electric-discharge machining apparatus. To this end, the fluid quality of the machining fluid is controlled so that conductivity (a specific resistance) of the machining fluid falls within a predetermined range in recycling of the machining fluid. If the machining fluid is the water-containing machining fluid, not only the conductivity (specific resistance) but also a hydrogen ion concentration of the machining fluid are controlled according to a material for the workpiece so as not to corrode the workpiece.

For instance, Patent Document 1 discloses an electric-discharge machining fluid circulation supply apparatus configured as follows. If a machining fluid used for electric-discharge machining on a workpiece consisting of special steel or heat-and-corrosion-resistant steel is to be subjected to a regeneration treatment, pH and conductivity of the machining fluid are measured by pH detector and conductivity detector, respectively. Based on these measurement results, the machining fluid is treated by pH regulator (which is specifically an ion exchange treatment device) if it is necessary to do so, thereby regulating the pH of the machining fluid to about six to seven.

Furthermore, Patent Document 2 discloses the following machining fluid-quality control apparatus. In controlling a fluid quality of a used machining fluid, the machining fluid is selectively supplied to a cation exchange unit and an anion exchange unit according to measurement results of pH measuring unit and a specific resistance measuring unit, respectively. A pH and a specific resistance (conductivity) of the machining fluid are thereby controlled within predetermined ranges, respectively.

Patent Document 3 discloses the following method for preventing corrosion of an iron-containing metal although both pH and conductivity of a machining fluid are not controlled by the method. In subjecting an iron-containing metal to wire electric-discharge machining, the machining fluid is circulated and supplied into a column filled with a cation exchange resin, to which one or more type of ions selected from among carbonic acid ions, hydrogen carbonate ions, and hydroxyl ions as well as nitrite ions are fixed. Corrosive ions are thereby removed from the machining fluid without increasing the conductivity of the machining fluid. Furthermore, Patent Document 4 proposes a method for preventing corrosion of a hard metal material or a metal material by adding water-soluble metal anticorrosive consisting of a tetrazol compound or a tetrazol-containing salt to water, thereby preventing corrosion of the hard metal material or the metal material.

Patent Document 1: Japanese Patent Application Laid-open No. S63-191514
Patent Document 2: Japanese Patent Application Laid-open No. H4-141319
Patent Document 3: Japanese Patent Application Laid-open No. 2002-301624
Patent Document 4: Japanese Patent Application Laid-open No. H7-145491

DISCLOSURE OF INVENTION

Problem to be Solved by the Invention

As explained, in recycling the water-containing machining fluid used in the electric-discharge machining apparatus, it is necessary to control the pH and the conductivity of the fluid. However, since each of the apparatuses disclosed in the Patent Documents 1 and 2 employs the pH detector (pH measuring unit) and the conductivity detector (specific resistance measuring unit), a manufacturing cost and a running cost of the apparatus disadvantageously rise.

Furthermore, with the method disclosed in the Patent Document 3, the conductivity (conductance) of the fluid is not changed. For this reason, if this method is applied to the recycling of the used water-containing machining fluid, the conductivity of the obtained machining fluid is often out of a desired range. The method disclosed in the Patent. Document 3 is effective to prevent the corrosion of a passivated metal such as an iron-containing metal. However, since the nitride ions accelerate corrosion of a hard metal material or a non-passivated metal material such as copper (Cu), this method cannot be expected to have an anticorrosion effect on the hard metal material and the non-passivated metal material.

The water-soluble metal anticorrosive disclosed in the Patent Document 4 is captured by the ion exchange resin normally employed in the recycling of the water-containing machining fluid in the electric-discharge machining apparatus. As a result, even if the water-soluble metal anticorrosive is added to the machining fluid, a concentration of the anticorrosive falls in a recycling process and cannot exhibit a sufficient anticorrosion effect.

The present invention has been achieved in view of the conventional problems. It is an object of the present invention to provide a fluid-quality control method, a fluid-quality control apparatus, and an electric-discharge machining apparatus that can prepare water-containing machining fluid used in electric-discharge machining to have a desired fluid quality at a low cost.

Means for Solving Problem

A fluid-quality control method according to one aspect of the present invention is for changing a fluid quality of a used water-containing machining fluid used in an electric-discharge machining or a fluid quality of an undiluted fluid that is a material for the water-containing machining fluid used in the electric-discharge machining, to a fluid quality of water-containing machining fluid for the electric-discharge machining. The fluid-quality control method includes a fluid-quality measuring step of measuring a fluid quality of a fluid-quality control target fluid; and a fluid-quality controlling step of, if the fluid quality measured at the fluid-quality measuring step is lower than a first conditional value, substituting impurity anions contained in the fluid-quality control target fluid by predetermined anions and impurity cations contained in the fluid-quality control target fluid by predetermined cations, and transforming the fluid-quality control target fluid into an electrolyte solution, and if the fluid quality measured at the fluid-quality measuring step is higher than a second conditional value that is equal to or higher than the first conditional value, purifying the fluid-quality control target fluid. The fluid-quality measuring step and the fluid-quality controlling step are repeatedly executed, thereby setting the fluid quality of the fluid-quality control target fluid to fall within a predetermined range, and transforming the fluid-quality control target fluid into the electrolyte solution having a correlation between pH and conductivity.

A fluid-quality control apparatus according to another aspect of the present invention prepares water-containing machining fluid for an electric-discharge machining by controlling a fluid quality of a used water-containing machining fluid used in the electric-discharge machining or a fluid quality of an undiluted fluid that is a material for the water-containing machining fluid used in the electric-discharge machining. The fluid-quality control apparatus includes a fluid-quality measuring unit that measures a fluid quality of a fluid-quality control target fluid; an electrolyte solutionizing unit that substitutes impurity anions contained in the fluid-quality control target fluid by predetermined anions, that substitutes impurity cations contained in the fluid-quality control target fluid by predetermined cations, and that thereby transforms the fluid-quality control target fluid into an electrolyte solution having a correlation between pH and conductivity; a purifying unit that purifies the fluid-quality control target fluid; a first fluid-quality control target fluid supply unit that supplies the fluid-quality control target fluid to the electrolyte solutionizing unit or the purifying unit; and a control unit that controls an operation of the first fluid-quality control target fluid supply unit according to the fluid quality measured by the fluid-quality measuring unit. The control unit includes a storage unit that stores a first conditional value and a second conditional value that is equal to or higher than the first conditional value for the fluid quality; and a fluid-quality control unit that controls the operation of the first fluid-quality control target fluid supply unit according to a magnitude relationship between each of the first conditional value and the second conditional value and the fluid quality measured by the fluid-quality measuring unit.

An electric-discharge machining apparatus according to still another aspect of the present invention includes a machining apparatus main-body that applies a high frequency pulsed voltage to a machining electrode and a workpiece while water-containing machining fluid is interposed between the machining electrode and the workpiece, and that machines the workpiece by an electric discharge generated between the machining electrode and the workpiece; a control apparatus that controls an operation of the machining apparatus main-body; a waste-fluid tank that stores a used water-containing machining fluid; and a fluid-quality control apparatus that controls a fluid quality of the used water-containing machining fluid or a fluid quality of an undiluted fluid that is a material for water-containing machining fluid. The fluid-quality control apparatus includes a fluid-quality measuring unit that measures a fluid quality of a fluid-quality control target fluid; an electrolyte solutionizing unit that substitutes impurity anions contained in the fluid-quality control target fluid by predetermined anions, that substitutes impurity cations contained in the fluid-quality control target fluid by predetermined cations, and that thereby transforms the fluid-quality control target fluid into an electrolyte solution having a correlation between pH and conductivity; a purifying unit that purifies the fluid-quality control target fluid; a first fluid-quality control target fluid supply unit that supplies the fluid-quality control target fluid to the electrolyte solutionizing unit or the purifying unit; and a control unit that controls an operation of the first fluid-quality control target fluid supply unit according to the fluid quality measured by the fluid-quality measuring unit. The control unit includes a storage unit that stores a first conditional value and a second conditional value that is equal to or higher than the first conditional value for the fluid quality; and a fluid-quality control unit that controls the operation of the first fluid-quality control target fluid supply unit according to a magnitude relationship between each of the first conditional value and the second conditional value and the fluid quality measured by the fluid-quality measuring unit.

Effect of the Invention

With the fluid-quality control method according to the present invention, the fluid-quality measuring step and the fluid-quality controlling step are repeatedly executed to set the fluid quality of the fluid-quality control target fluid to fall within the predetermined range. In addition, the fluid-quality control target fluid is transformed into the electrolyte solution having the correlation between the pH and the conductivity. Therefore, by controlling only the pH of the fluid-quality control target fluid, the conductivity of the fluid-quality control target fluid can be controlled. Alternatively, by controlling only the conductivity of the fluid-quality control target fluid, the pH of the fluid-quality control target fluid can be controlled. As a consequence, in preparing the water-containing machining fluid having the desired fluid quality to be used in the electric-discharge machining, one of the conductivity measuring unit and the pH measuring unit can be dispensed with.

Furthermore, each of the fluid-quality control apparatus and the electric-discharge machining apparatus according to the present invention prepares the water-containing machining fluid based on the fluid-quality control method. Therefore, in preparing the water-containing machining fluid having the desired fluid quality to be used in the electric-discharge machining, one of the conductivity measuring unit and the pH measuring unit can be dispensed with.

Therefore, according to these inventions, one of the conductivity measuring unit and the pH measuring unit can be dispensed with. Accordingly, a cost required for preparing the water-containing machining fluid and a manufacturing cost or a running cost of each of the fluid-quality control apparatus and the electric-discharge machining apparatus can be easily reduced.

EXPLANATIONS OF LETTERS OR NUMERALS

Figure 1:
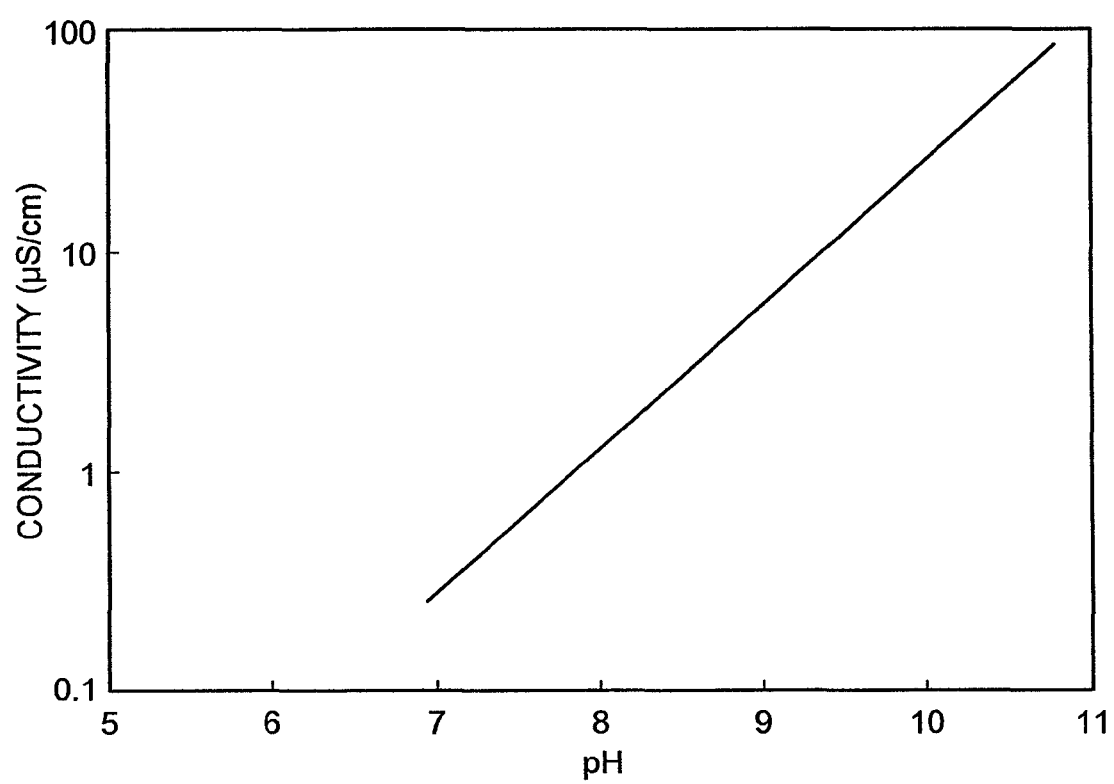
FIG. 1 is a graph of the relationship between pH and conductivity of a sodium hydroxide (NaOH) aqueous fluid.

1 Fluid-quality control target fluid
5 Fluid-quality measuring unit
7 $Na^+$ type cation exchange resin column
8 $OH^-$ type anion exchange resin column
10A, 10B Electrolyte solutionizing unit
15 First supply unit
17 $H^+$ type cation exchange resin column
20A, 20B Purifying unit
25 Second supply unit
31 Pump
35 Channel switching unit
40 First fluid-quality control target fluid supply unit
50 Electrolytic-water producing unit
60 Second fluid-quality control target fluid supply unit
67 Storage unit
68A, 68B, 68C Fluid-quality control unit
70A, 70B, 70C Control unit
80, 80A, 80B, 80C Fluid-quality control apparatus
120 Machining apparatus main-body
130 Control apparatus
140 Waste-fluid tank
160, 160A, 160B, 160C Electric-discharge machining apparatus

BEST MODE(S) FOR CARRYING OUT THE INVENTION

Exemplary embodiments of a fluid-quality control method, a fluid-quality control apparatus, and an electric-discharge machining apparatus according to the present invention will be explained in detail below with reference to the accompanying drawings. Note that the invention is not limited to the embodiments.

First Embodiment

A fluid-quality control method according to the present invention is a fluid-quality control method for changing a fluid quality of a used water-containing machining fluid used in electric-discharge machining or that of an undiluted fluid that is a material for the water-containing machining fluid used in the electric-discharge machining to that of water-containing machining fluid for the electric-discharge machining. The fluid quality of the fluid-quality control target fluid is controlled to transform the fluid-quality controlled fluid into a predetermined electrolyte solution, thereby making it possible to reduce a cost required to prepare the water-containing machining fluid. To this end, this fluid-quality control method includes a fluid-quality measuring step of measuring the fluid quality of the fluid-quality control target fluid and a fluid-quality controlling step of controlling the fluid quality of the fluid-quality control target fluid. The respective steps will be explained in detail, while taking an instance in which the fluid quality is pH as an example.

(Fluid-Quality Measuring Step)

At the fluid-quality measuring step, pH of the fluid-quality control target fluid is measured. This pH can be measured by an ordinary method using pH meter or the like. With a view of automating fluid-quality control, the pH is preferably measured automatically by an electric method. It is noted that the pH can be either directly measured or calculated after measuring a hydroxyl ion concentration.

(Fluid-Quality Controlling Step)

At the fluid-quality controlling step, if the pH measured at the fluid-quality measuring step is lower than a first conditional value, impurity anions contained in the fluid-quality control target fluid are substituted by predetermined anions. In addition, impurity cations contained in the fluid-quality control target fluid are substituted by predetermined cations. The fluid-quality control target fluid is transformed into a predetermined electrolyte solution, that is, an electrolyte solution that has a correlation between pH and conductivity of the fluid. If the pH measured at the fluid-quality measuring step is higher than a second conditional value, the fluid-quality control target fluid is purified into pure water. The fluid-quality control step and the fluid-quality measuring step are executed either periodically or sequentially in parallel.

The first conditional value and the second conditional value can be appropriately set according to an allowable pH range for the water-containing machining fluid to be obtained from the fluid-quality control target fluid, a performance of an instrument used to control the fluid quality of the fluid quality target fluid, a fluid amount of the fluid-quality control target fluid, and the like. The first and the second conditional values can be set either equal to each other or different from each other.

For instance, if a workpiece consisting of a hard metal material such as a tungsten carbide (WC)-cobalt (Co) containing material or a non-passivated metal material such as copper (Cu), iron (Fe) or zinc (Zn), the workpiece tends to be corroded by the water-containing machining fluid when the pH of the water-containing machining fluid is lower than 8.5. In addition, the conductivity of the water-containing machining fluid is increased (e.g., exceeds 70 µS/cm) and electric discharge stability tends to be deteriorated when the pH is higher than 10.5. It is, therefore, preferable to appropriately set the first and the second conditional values so that the pH of the fluid-quality control target fluid falls within a range of 8.5 to 10.5 according to the performance of the instrument used to control the fluid quality of the fluid-quality control target fluid, the fluid amount of the fluid-quality control target fluid, and the like if the water-containing machining fluid used to subject the workpiece consisting of the hard metal material or the non-passivated metal material to electric-discharge machining. If the hard metal material or the non-passivated metal material is subjected to, for example, wire electric-discharge machining, the conductivity of the water-containing machining fluid is preferably about 3 µS/cm to 63 µS/cm.

The transformation of the fluid-quality control target fluid into the electrolyte solution executed when the pH measured at the fluid-quality measuring step is lower than the first conditional value can be executed as follows. The fluid-quality control target fluid is supplied to an ion exchange resin column filled with, for example, a mixture of a cation exchange resin and an anion exchange resin or an ion exchange resin column in which a region filled with the cation exchange resin and a region filled with the anion exchange resin are arranged either in series or in parallel.

As the cation exchange resin, an alkali metal ion (e.g., $Na^+$ or $K^+$) type cation exchange resin or an alkaline-earth metal ion (e.g., $Ca^{2+}$) type cation exchange resin, for example, can be used. As the anion exchange resin, an $OH^-$ type anion exchange resin, for example, can be used. If the fluid-quality control target fluid is transformed into the electrolyte solution using these ion exchange resins, a hydroxide fluid is formed from the fluid-quality control target fluid.

The purification executed when the pH measured at the fluid-quality measuring step is higher than the second conditional value can be executed by using, for example, ion exchange resins as follows. The fluid-quality control target fluid is supplied to the ion exchange resin column filled with, for example, a mixture of the $H^+$ type cation exchange resin and the $OH^-$ type anion exchange resin or the ion exchange resin column in which the region filled with the cation exchange resin and the region filled with the anion exchange resin are arranged either in series or in parallel.

At this time, the purification can be performed so that impurity ions do not substantially remain in a fluid after the purification (ion exchange water). Preferably, a magnitude and a performance of the ion exchange resin column to be used are appropriately controlled so that impurity ions remain in the fluid after the purification (ion exchange water) by a predetermined amount. This reason will be explained later.

In the fluid-quality control method according to the present invention, the fluid-quality measuring step and the fluid-quality controlling step are repeatedly executed to set the pH of the fluid-quality control target fluid to fall within the predetermined range and to transform the fluid-quality control target fluid into the electrolyte solution having the correlation between the pH and the conductivity. By doing so, the water-containing machining fluid is prepared. A pH and conductivity of the water-containing machining fluid thus prepared correlate to each other. Due to this, if this correlation is experimentally grasped in advance, the water-containing machining fluid having a controlled pH and a controlled conductivity can be obtained only by controlling the pH of the fluid-quality control target fluid.

If the electrolyte solution is a hydroxide fluid, the conductivity of the hydroxide fluid is specified by an $OH^-$ concentration. Therefore, only by controlling the pH of the hydroxide fluid, alkaline water-containing machining fluid having the controlled conductivity can be prepared.

As for a sodium hydroxide (NaOH) aqueous fluid which is one example of the hydroxide fluid, the fluid has the correlation between the pH and the conductivity as shown in FIG. 1. Due to this, only by measuring the pH of the NaOH aqueous fluid, the conductivity thereof can be obtained from the pH. FIG. 1 is a graph of the relationship between the pH and the conductivity of the NaOH aqueous fluid. In FIG. 1, a horizontal axis indicates the pH of the NaOH aqueous fluid and a vertical axis indicates the conductivity thereof.

As can be seen, with the machining fluid-quality control method according to the present invention, the water-containing machining fluid having the controlled conductivity as well as the controlled pH can be prepared only by controlling the pH of the fluid-quality control target fluid. It is, therefore, possible to prepare the water-containing machining fluid that has high electric-discharge stability during the electric-discharge machining and that makes it difficult to corrode the workpiece without measuring the conductivity of the fluid-quality control target fluid in the process of fluid-quality control. This can dispense with means for measuring the conductivity such as the conductivity meter, and facilitate reducing the manufacturing cost or running cost of the instrument used for the fluid-quality control or the apparatus including the instrument.

As already explained, the purification at the fluid-quality controlling step is preferably performed so that the impurity ions remain in the fluid after the purification (ion exchange water) by the predetermined amount. By thus performing the purification, a non-recycled, unused water-containing machining fluid can be prepared by an instrument used for the purification and an instrument used to produce the electrolyte solution.

Namely, the non-recycled, unused water-containing machining fluid is normally prepared by regulating components of a freshwater such as running water, an industrial water, or a ground water. If the freshwater is purified so that impurity ions remain by the predetermined amount, the water-containing machining fluid having the desired pH and the desired conductivity can be prepared by transforming the fluid-quality control target fluid into the electrolyte solution after the purification. Since this can dispense with a dedicated instrument for preparing the non-recycled, unused water-containing machining fluid, a cost for constructing electric-discharge machining equipment can be easily reduced. The amount of the impurity ions remaining in the fluid after the purification (ion exchange water) is appropriately set according to a target pH to obtain the electrolyte solution having the desired pH by the subsequent transformation of the fluid-quality control target fluid into the electrolyte solution.

If the water-containing machining fluid consisting of the hydroxide fluid is to be prepared by the fluid-quality control method according to the present invention, a sub-step of electrolyzing the fluid-quality control target fluid and adding alkaline water produced by the electrolysis to the fluid-quality control target fluid can be additionally executed if it is necessary to do so. By adding this sub-step, the following technical advantages can be further attained.

The pH of the fluid-quality control target fluid or the water-containing machining fluid is gradually lower if carbon dioxide contained in the air is dissolved into the fluid even without performing the electric-discharge machining. Such a change in fluid quality can be dealt with not by executing the fluid-quality controlling step but by executing the sub-step. Consequently, a cost required to prepare the water-containing machining fluid having the desired fluid quality can be easily reduced. In addition, if the sub-step is executed in parallel to the fluid-quality controlling step, it is possible to reduce a time required to set the pH of the fluid-quality control target fluid to be equal to or higher than the first conditional value when the pH is lower than the first conditional value. This is because pH of the alkaline water is relatively high. A conditional value (a third conditional value) based on which it is determined whether to electrolyze the fluid-quality control target fluid can be set either equal to the first conditional value or different therefrom according to a performance of an instrument used for the electrolysis and the like.

Second Embodiment

A fluid-quality control apparatus according to the present invention is based on the fluid-quality control method according to the present invention. Namely, the fluid-quality control apparatus controls the fluid quality of the used water-containing machining fluid used in the electric-discharge machining or that of the undiluted fluid that is the material for the water-containing machining fluid used in the electric-discharge machining, and thereby prepares the water-containing machining fluid. The apparatus includes a fluid-quality measuring unit, an electrolyte solutionizing unit, a purifying unit, a first fluid-quality control target fluid supply unit, and a control unit. The fluid-quality control apparatus based on the fluid-quality control method explained in the first embodiment and configured so that the first fluid-quality control target fluid supply unit is constituted by a first supply unit and a second supply unit will be explained in detail.

Figure 2:
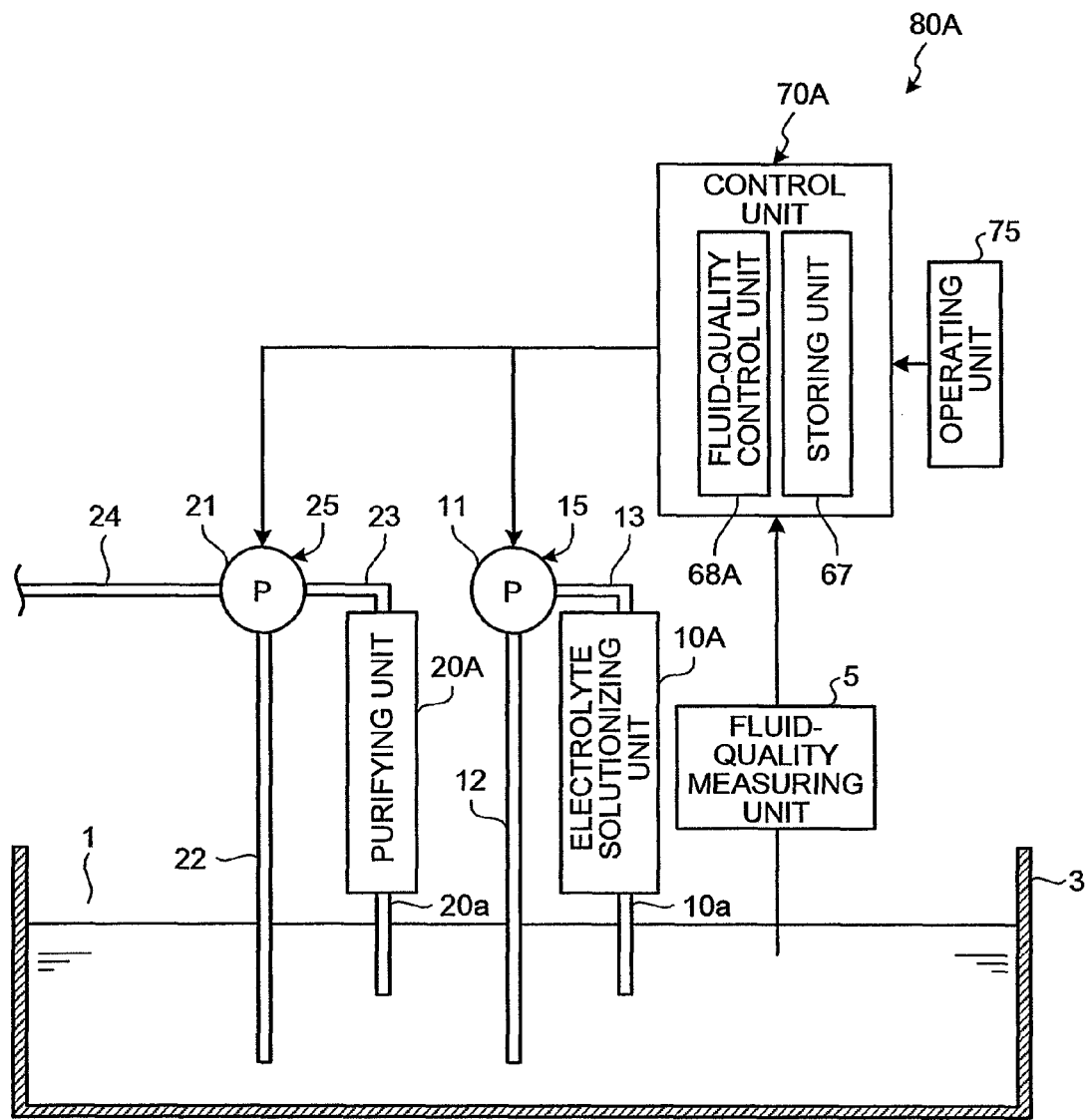
FIG. 2 is a schematic block diagram of one example of a fluid-quality control apparatus according to the present invention.

FIG. 2 is a schematic block diagram of one example of the fluid-quality control apparatus according to the present invention. A fluid-quality control apparatus 80A shown in FIG. 2 includes a machining fluid tank 3, a fluid-quality measuring unit 5, an electrolyte solutionizing unit 10A, a first supply unit 15, a purifying unit 20A, and a second supply unit 25. The machining fluid tank 3 stores a fluid-quality control target fluid 1. The fluid-quality measuring unit 5 measures the fluid quality (which is specifically the pH) of the fluid-quality control target fluid 1 stored in the machining fluid tank 3. The electrolyte solutionizing unit 10A transforms the fluid-quality control target fluid 1 into the electrolyte solution having the correlation between the pH and the conductivity. The first supply unit 15 supplies the fluid-quality control target fluid 1 to the electrolyte solutionizing unit 10A. The purifying unit 20A purifies the fluid-quality control target fluid 1 into the pure water. The second supply unit 25 supplies the fluid-quality control target fluid 1 to the purifying unit 20A. The first supply unit 15 and the second supply unit 25 constitute the first fluid-quality control target fluid supply unit.

The fluid-quality control apparatus 80A also includes a control unit 70A that controls operations of the first supply unit 15 and the second supply unit 25, respectively, according to the pH measured by the fluid-quality measuring unit 5, and an operating unit 75 that indicates activation, stop, and the like of the control unit 70A.

The fluid-quality measuring unit 5 measures the pH of the fluid-quality control target fluid 1 either periodically or continuously, and transmits a measuring result to the control unit 70A by wired or wireless communication.

If the first supply unit 15 supplies the fluid-quality control target fluid 1 to the electrolyte solutionizing unit 10A, the electrolyte solutionizing unit 10A substitutes impurity cations contained in the fluid-quality control target fluid 1 by predetermined metal ions. In addition, the electrolyte solutionizing unit 10A transforms the fluid-quality control target fluid 1 into the electrolyte solution, e.g., the hydroxide fluid having the correlation between the pH and the conductivity. The electrolyte solutionizing unit 10A is constituted by, for example, the ion exchange resin column filled with the mixture of the cation exchange resin and the anion exchange resin or the ion exchange resin column in which the region filled with the cation exchange resin and the region filled with the anion exchange resin are arranged either in series or in parallel.

As the cation exchange resin, an alkali metal ion (e.g., $Na^+$ or $K^+$) type cation exchange resin or an alkaline-earth metal ion (e.g., $Ca^{2+}$) type cation exchange resin, for example, can be used. Specific examples of the $Na^+$ type cation exchange resin include AMBERLITE™IR120B Na (product name) manufactured by Rohm and Haas Company and DIAION™ series (product name) manufactured by Mitsubishi Chemical Corporation. Each of these resins includes a styrene-divinylbenzene copolymer, a phenol-formalin resin or the like as a substrate and a sulfonic acid group as an ion exchange group.

As the anion exchange resin, an $OH^-$ type anion exchange resin, for example, can be used. Specific examples of the $OH^-$ type anion exchange resin include a resin obtained by transforming AMBERLITE®IRA400J Cl (product name) manufactured by Rohm and Haas Company into an $OH^-$ type anion exchange resin and a resin obtained by transforming DIAION™ SA10A (product name) manufactured by Mitsubishi Chemical Corporation into an $OH^-$ type anion exchange resin. Each of these resins includes a styrene-divinylbenzene copolymer as a substrate and a trimethyl ammonium group, a β-hydroxyethyl dimethyl ammonium group or the like as an ion exchange group. A drain pipe 10a is connected to one end of the electrolyte solutionizing unit 10A, and the hydroxide fluid produced by the electrolyte solutionizing unit 10A is supplied to the machining fluid tank 3 through the drain pipe 10a.

The first supply unit 15 includes a pump 11, a water intake pipe 12, and a water supply pipe 13. An operation of the pump 11 is controlled by the control unit 70A. The water intake pipe 12 has one end arranged within the machining fluid tank 3 and the other end connected to the pump 11. The water supply pipe 13 has one end connected to the pump 11 and the other end connected to the electrolyte solutionizing unit 10A. The first supply unit 15 supplies the fluid-quality control target fluid 1 to the electrolyte solutionizing unit 10A while an operation of the first supply unit 15 is controlled by the control unit 70A.

The purifying unit 20A purifies the fluid-quality control target fluid 1 when the fluid-quality control target fluid 1 is supplied to the purifying unit 20A by the second supply unit 25. A drain pipe 20a is connected to one end of the purifying unit 20A, and pure water (an ion exchange water) produced by the purifying unit 20A is supplied to the machining fluid tank 3 through the drain pipe 20a.

The purifying unit 20A is constituted by, for example, the ion exchange resin column filled with the mixture of the $H^+$ type cation exchange resin and the $OH^-$ type anion exchange resin or the ion exchange resin column in which the region filled with the $H^+$ type cation exchange resin and the region filled with the $OH^-$ type anion exchange resin are arranged either in series or in parallel.

As the $H^+$ type cation exchange resin, an $H^+$ type cation ion resin that includes styrene-divinylbenzene copolymer, a phenol-formalin resin or the like as a substrate and a sulfonic acid group as an ion exchange group, for example, can be used. Specific examples of the $H^+$ type cation ion resin include a resin obtained by transforming AMBERLITE™IR120B Na (product name) manufactured by Rohm and Haas Company into an $H^+$ type cation exchange resin and a resin obtained by transforming DIAION™ SK1B (product name) manufactured by Mitsubishi Chemical Corporation into an $H^+$ type cation exchange resin. As the $OH^-$ type anion exchange resin, one of the same resins as those explained in relation to the electrolyte solutionizing unit 10A can be used.

The second supply unit 25 includes a pump 21, a water intake pipe 22, and a first water supply pipe 23. An operation of the pump 21 is controlled by the control unit 70A. The water intake pipe 22 has one end arranged within the machining fluid tank 3 and the other end connected to the pump 21. The first water supply pipe 23 has one end connected to the pump 21 and the other end connected to the purifying unit 20A. The second supply unit 25 supplies the fluid-quality control target fluid 1 to the purifying unit 20A while an operation of the second supply unit 25 is controlled by the control unit 70A.

The control unit 70A includes a storage unit 67 and a fluid-quality control unit 68A. The storage unit 67 stores conditional values for the pH to be measured by the fluid-quality measuring unit 5. The fluid-quality control unit 68A controls the operations of the first supply unit 15 and the second supply unit 25, respectively, according to a magnitude relationship between the pH measured by the fluid-quality measuring unit 5 and each of the conditional values. As the conditional values, the first conditional value and the second conditional value explained in the first embodiment are stored in the storage unit 67. However, if the first conditional value and the second conditional value are set equal to each other, one value is stored as the first and the second conditional values.

The fluid-quality control unit 68A compares the pH measured by the fluid-quality measuring unit 5 with the first conditional value stored in the storage unit 67. If the pH measured by the fluid-quality measuring unit 5 is lower than the first conditional value, the fluid-quality control unit 68A controls the first supply unit 15 to operate and the electrolyte solutionizing unit 10A to transform the fluid-quality control target fluid 1 into the electrolyte solution. If the pH measured by the fluid-quality measuring unit 5 is higher than the second conditional value, the fluid-quality control unit 68A controls the second supply unit 25 to operate and the purifying unit 20A to purify the fluid-quality control target fluid 1.

In the fluid-quality control apparatus 80A thus configured, the fluid-quality measuring unit 5 measures the pH of the fluid-quality control target fluid 1 either periodically or continuously. In addition, the transformation of the fluid-quality control target fluid 1 into the electrolyte solution and the purification are performed either periodically or continuously. As a result, if the pH of the fluid-quality control target fluid 1 stored in the machining fluid tank 3 is higher than the first conditional value or higher than the second conditional value, the pH is automatically controlled to fall within the predetermined range.

The electrolyte solution produced by the electrolyte solutionizing unit 10A has the correlation between the pH and the conductivity as explained. Therefore, only by controlling the pH of the fluid-quality control target fluid 1 in the machining fluid tank 3, it is possible to prepare the water-containing machining fluid that has high electric-discharge stability during the electric-discharge machining and that makes it difficult to corrode the workpiece from the fluid-quality control target fluid 1.

As can be seen, it is unnecessary for the fluid-quality control apparatus 80A to measure the conductivity of the fluid-quality control target fluid 1 using the conductivity meter or the like in the process of controlling the fluid quality of the fluid-quality control target fluid 1. This can dispense with means for measuring the conductivity. Accordingly, a cost required to prepare the water-containing machining fluid and a manufacturing cost or a running cost of the fluid-quality control apparatus 80A itself can be easily reduced.

As explained in the first embodiment, the purifying unit 20A preferably purifies the fluid-quality control target fluid 1 so that the impurity ions remain in the fluid after the purification (ion exchange water) by the predetermined amount. If the purifying unit 20A thus purifies the fluid-quality control target fluid 1, it is preferable that one end of a second water supply pipe 24 for supplying a freshwater such as running water, industrial water or ground water to the purifying unit 20A is connected to the pump 21. The other end of the second water supply pipe 24 is connected to a freshwater supply source (not shown).

If the fluid-quality control apparatus 80A is thus configured, a non-recycled, unused water-containing machining fluid can be prepared by the fluid-quality control apparatus 80A. In preparation of the non-recycled, unused water-containing machining fluid, the freshwater such as the running water, the industrial water or ground water is supplied by the second supply unit 25 to the purifying unit 20A through the second water supply pipe 24, the pump 21, and the first water supply pipe 23. The purifying unit 20A purifies the freshwater so that impurity ions remain in the freshwater by a predetermined amount and produces the ion exchange water. This ion exchange water is stored in the machining fluid tank 3. At this time, a user of the fluid-quality control apparatus 80A operates the operating unit 75 so that the control unit 70A controls the pump 21 to operate before supply of the freshwater.

For instance, if potassium ions ($K^+$) and chlorine ions ($Cl^-$) are present in the freshwater as impurity cations and impurity anions, respectively, a reaction represented by the following formula (1) proceeds in the $H^+$ type cation exchange resin that constitutes the purifying unit 20A, thereby substituting $K^+$ by hydrogen ions ($H^+$). In addition, a reaction represented by the following formula (2) proceeds in the $OH^-$ type anion exchange resin that constitutes the purifying unit 20A, thereby substituting $Cl^-$ by $OH^-$. As a result, while the impurities in the freshwater are reduced, water ($H_2O$) is newly produced and the ion exchange water is obtained. In the formulas (1) and (2), symbol "R" denotes the substrate of the ion exchange resin.

   (1)

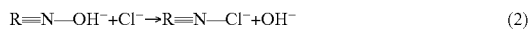   (2)

Since the ion exchange water thus produced by the purifying unit 20A is substantially neutral, pH of the ion exchange water stored in the machining fluid tank 3 is lower than the first conditional value. Namely, the pH measured by the fluid-quality measuring unit 5 is lower than the first conditional value. As a result, the control unit 70A controls the first supply unit 15 to operate and the electrolyte solutionizing unit 10A to transform the ion exchange water into the electrolyte solution. At this time, the purified freshwater contains impurities, e.g., $K^+$ and sulfuric acid ions ($SO_4^{2-}$) by the predetermined amount. Therefore, a reaction represented by, for example, the following formula (3) proceeds in the cation exchange resin that constitutes the electrolyte solutionizing unit 10A, thereby substituting $K^+$ by sodium ions ($Na^+$). In addition, a reaction represented by, for example, the following formula (4) proceeds in the anion exchange resin that constitutes the electrolyte solutionizing unit 10A, thereby substituting $SO_4^{2-}$ by $OH^-$. In the formulas (3) and (4), symbol "R" denotes the substrate of the ion exchange resin.

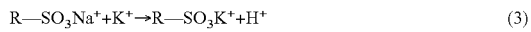   (3)

   (4)

As a result of proceeding of producing the electrolyte solution (hydroxide fluid) by the electrolyte solutionizing unit 10A, while the impurities in the ion exchange water are reduced, a new sodium hydroxide (NaOH) aqueous fluid is produced and the water-containing machining fluid consisting of the sodium hydroxide aqueous fluid is prepared. Namely, the non-recycled, unused water-containing machining fluid is prepared from the freshwater.

Figure 3:
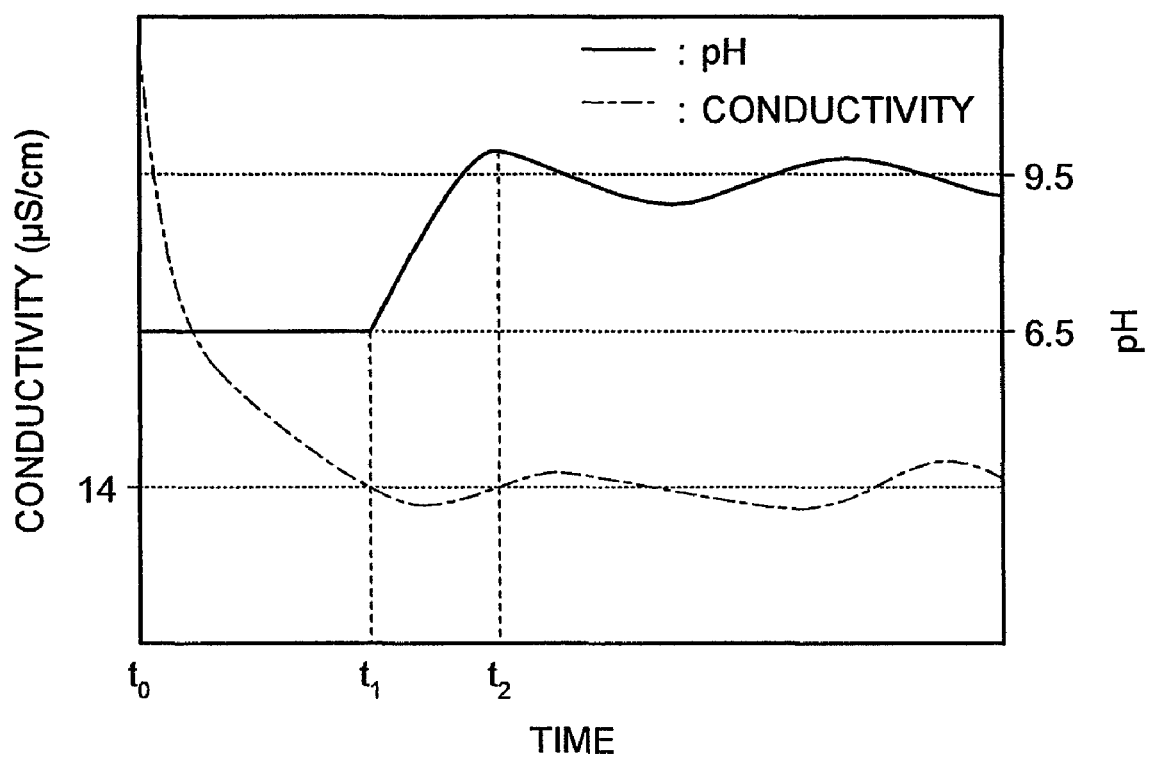
FIG. 3 is a graph of one example of temporal changes in the pH and the conductivity if water-containing machining fluid is prepared from running water by the fluid-quality control apparatus shown in FIG. 2.

FIG. 3 is a graph of one example of temporal changes in the pH and the conductivity if the water-containing machining fluid is prepared from the running water by the fluid-quality control apparatus 80A. In FIG. 3, a horizontal axis indicates time since a time ($=t_0$) at which the running water is injected, a left vertical axis indicates the conductivity of the fluid-quality control target fluid within the machining fluid tank 3, and a right vertical axis indicates the pH of the fluid within the machining fluid tank 3.

Data shown in FIG. 3 is one on the fluid-quality control apparatus 80A if the electrolyte solutionizing unit 10A and the purifying unit 20A are constituted as follows. The electrolyte solutionizing unit 10A is constituted using a mixture of AMBERLITE™IR120B Na (product name) manufactured by Rohm and Haas Company and a resin obtained by transforming AMBERLITE™IRA400J (product name) manufactured by the same company into the $OH^-$ type anion exchange resin. The purifying unit 20A is constituted using a mixture of a resin obtained by transforming AMBERLITE™IR120B Na (product name) manufactured by Rohm and Haas Company into the $H^+$ type cation exchange resin and the resin obtained by transforming AMBERLITE™IRA400J (product name) manufactured by the same company into the $OH^-$ type anion exchange resin. The running water used herein has pH of 6.5 and conductivity of 147 µS/cm. In addition, only a conditional value of 9.5 is stored as the first and the second conditional values in the storage unit 67 that constitutes the control unit 70A. These first and second conditional values will be referred to simply as "the conditional value" hereinafter.

The time $t_0$ shown in FIG. 3 is a time at which the running water starts to be supplied to the purifying unit 20A. From this time $t_0$ to a time $t_1$, only the purifying unit 20A operates while the electrolyte solutionizing unit 10A remains inoperable. During this period, impurity ions contained in the running water are removed and an ion exchange water having pH of 6.2 is produced. If an amount of produced ion exchange water increases, the conductivity of the ion exchange water in the machining fluid tank 3 is greatly reduced. However, the pH is not greatly changed.

At the time $t_1$, the fluid-quality measuring unit 5 operates to measure the pH of the ion exchange water in the machining fluid tank 3. Since this measured pH is lower than the conditional value, the control unit 70A controls the electrolyte solutionizing unit 10A to operate. As a result, the transformation of the ion exchange water in the machining fluid tank 3 into the electrolyte solution (hydroxide fluid) starts proceeding, and the pH measured by the fluid-quality measuring unit 5 increases. If this measured pH exceeds the conditional value of 9.5, then the control unit 70A stops the electrolyte solutionizing unit 10A and controls the purifying unit 20A to operate. The pH of the ion exchange water decreases, accordingly. If the pH is lower than 9.5, then the purifying unit 20A is stopped and the electrolyte solutionizing unit 10A operates again. The pH starts increasing again, accordingly. After the time $t_2$, a good correlation is recognized between the pH and the conductivity, and the water-containing machining fluid having pH within a range from 8.5 to 10.5 and conductivity of about 14 µS/cm is obtained. It is noted that supply of the running water to the purifying unit 20A is continued until a predetermined amount of the water-containing machining fluid is obtained, irrespectively of the pH measured by the fluid-quality measuring unit 5.

A WC-Co containing hard metal material, copper (Cu), and iron (Fe) are immersed into the water-containing machining fluid thus prepared for four days and it is confirmed whether they are corroded. As a result, each of the WC-Co containing hard metal material, copper (Cu), and iron (Fe) is corroded only slightly and discolored only slightly. For comparison, an ion exchange water having pH of 6.2 and conductivity of 7.8 µS/cm is prepared by supplying the running water only to the purifying unit 20A. In addition, the same WC-Co containing hard metal material, copper (Cu), and iron (Fe) are immersed into this ion exchange water for four days and it is confirmed whether the WC-Co containing hard metal material, copper (Cu), and iron (Fe) are corroded. As a result, it is possible to visually confirm that they are corroded more than those immersed into the water-containing machining fluid.

Third Embodiment

In the fluid-quality control apparatus according to the present invention, the first fluid-quality control target fluid supply unit can be constituted by a channel switching unit and a pump for supplying the fluid-quality control target fluid to the channel switching unit. The channel switching unit selectively switches over a channel of the fluid-quality control target fluid between an electrolyte solutionizing unit side and a purifying unit side. Furthermore, each of the electrolyte solutionizing unit and the purifying unit can be constituted by arranging a predetermined cation exchange resin column and a predetermined anion exchange resin column in parallel. If so, one anion exchange resin column can be shared between the electrolyte solutionizing unit and the purifying unit.

Figure 4:
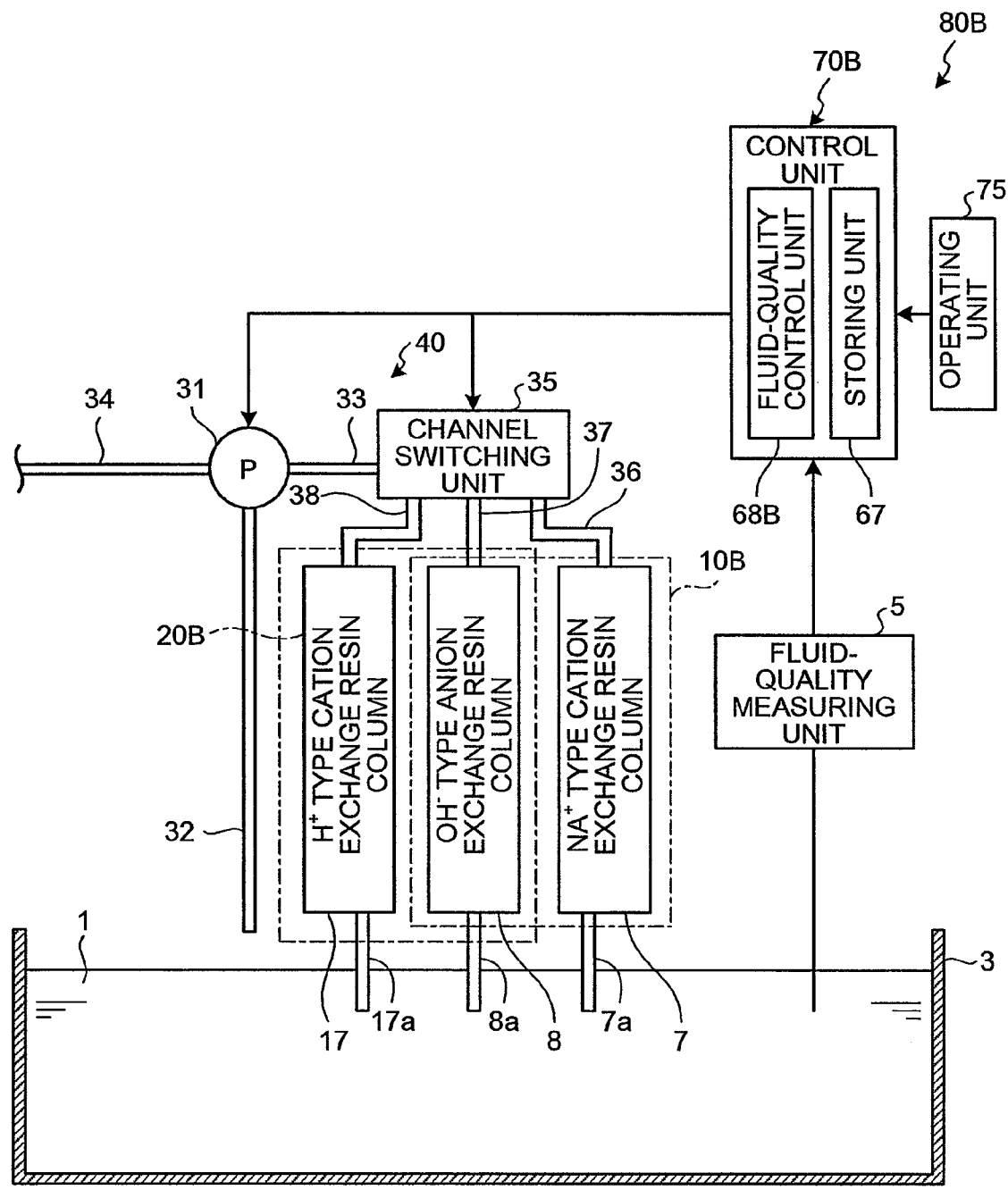
FIG. 4 is a schematic block diagram of one example of the fluid-quality control apparatus according to the present invention in which an electrolyte solutionizing unit and a purifying unit are each configured by arranging a predetermined cation exchange resin column and a predetermined anion exchange resin column in parallel in the fluid-quality control apparatus.

FIG. 4 is a schematic block diagram of one example of the fluid-quality control apparatus according to the present invention in which the electrolyte solutionizing unit and the purifying unit are configured each by arranging the predetermined cation exchange resin column and the predetermined anion exchange resin column in parallel in the fluid-quality control apparatus. Among the constituent elements shown in FIG. 4, those common to the constituent elements shown in FIG. 2 are denoted by the same reference numerals, respectively and will not be explained herein.

In a fluid-quality control apparatus 80B shown in FIG. 4, an electrolyte solutionizing unit 10B is constituted by an $Na^+$ type cation exchange resin column 7 and an $OH^-$ type anion exchange resin column 8 arranged in parallel to each other. A drain pipe 7a is connected to one end of the $Na^+$ type cation exchange resin column 7, and a drain pipe 8a is connected to one end of the $OH^-$ type anion exchange resin column 8. Furthermore, the $OH^-$ type anion exchange resin column 8 and an $H^+$ type cation exchange resin column 17 arranged in parallel to the $OH^-$ type anion exchange resin column 8 constitute a purifying unit 20B. A drain pipe 17a is connected to one end of the $H^+$ type cation exchange resin column 17. The $OH^-$ type anion exchange resin column 8 functions as a constituent element of the electrolyte solutionizing unit 10B and also functions as a constituent element of the purifying unit 20B. Namely, the $OH^-$ type anion exchange resin column 8 is shared between the electrolyte solutionizing unit 10B and the purifying unit 20B.

It suffices that the cation exchange resin column that constitutes the electrolyte solutionizing unit 10B can substitute impurity cations contained in the fluid-quality control target fluid 1 by metal ions that form, for example, a hydroxide. The $Na^+$ type cation resin exchange column 7 can be replaced by an alkali metal ion type cation resin exchange column or an alkaline-earth metal ion type cation resin exchange column.

The fluid-quality control target fluid 1 is supplied to the electrolyte solutionizing unit 10B and the purifying unit 20B by a first fluid-quality control target fluid supply unit 40. The first fluid-quality control target fluid supply unit 40 includes a pump 31 and a channel switching unit 35. Operations of the pump 31 and the channel switching unit 35 are controlled by a fluid-quality control unit 68B that constitutes a control unit 70B. A water intake pipe 32, a first water supply pipe 33, and a second water supply pipe 34 are connected to the pump 31, and three pipes 36, 37, and 38 are connected to the channel switching unit 35. The water intake pipe 32 has one end arranged within the machining fluid tank 3. The first water supply pipe 33 has one end connected to the channel switching unit 35. The second water supply pipe 34 has one end connected to a freshwater supply source (not shown).

The pump 31 supplies the fluid-quality control target fluid 1 within the machining fluid tank 3 or the freshwater to the channel switching unit 35. The channel switching unit 35, an operation of which is controlled by the fluid-quality control unit 68B, switches over a channel of either the fluid-quality control target fluid 1 or the freshwater supplied from the pump 31 among the pipes 36, 37, and 38. Such channel switching unit 35 can be constituted by, for example, one to three solenoid valves. One end of the pipe 36 is connected to the $Na^+$ type cation resin exchange column 7, one end of the pipe 37 is connected to the $OH^-$ type anion exchange resin column 8, and one end of the pipe 38 is connected to the H+ type cation exchange resin column 17.

If pH measured by the fluid-quality measuring unit 5 is lower than the first conditional value (which is the first conditional value stored in the storage unit 67), the first fluid-quality control target fluid supply unit 40 supplies the fluid-quality control target fluid 1 within the machining fluid tank 3 or the freshwater to the $Na^+$ type cation resin exchange column 7 and the $OH^-$ type anion exchange resin column 8. The $Na^+$ type cation resin exchange column 7 produces an ion exchange water containing $Na^+$, and supplies the generated ion exchange water to the machining fluid tank 3. The $OH^-$ type anion exchange resin column 8 produces an ion exchange water containing $OH^-$, and supplies the generated ion exchange water to the machining fluid tank 3. As a result, the electrolyte solutionizing unit 10A produces a sodium hydroxide (NaOH) aqueous fluid, and transformation of the fluid-quality control target fluid 1 within the machining fluid tank 3 into the electrolyte solution (hydroxide fluid) proceeds.

If the pH measured by the fluid-quality measuring unit 5 is higher than the second conditional value (which is the second conditional value stored in the storage unit 67), the first fluid-quality control target fluid supply unit 40 supplies the fluid-quality control target fluid 1 within the machining fluid tank 3 or the freshwater to the H+ type cation exchange resin column 17 and the $OH^-$ type anion exchange resin column 8. The H+ type cation exchange resin column 17 produces an ion exchange water containing $H^+$, and supplies the generated ion exchange water to the machining fluid tank 3. The $OH^-$ type anion exchange resin column 8 produces an ion exchange water containing $OH^-$, and supplies the generated ion exchange water to the machining fluid tank 3. As a result, the purifying unit 20A produces pure water (an ion exchange water), and purification of the fluid-quality control target fluid 1 within the machining fluid tank 3 proceeds.

As can be seen, the fluid-quality control apparatus 80B controls the fluid quality of the fluid-quality control target fluid 1 within the machining fluid tank 3 similarly to the fluid-quality control apparatus 80A shown in FIG. 2 except for the following respects. The fluid-quality control apparatus 80B differs from the fluid-quality control apparatus 80A in configurations of the electrolyte solutionizing unit and the purifying unit and a configuration of the first fluid-quality control target fluid supply unit that supplies the water-containing machining fluid to the electrolyte solutionizing unit and the purifying unit.

Therefore, if the pH of the fluid-quality control target fluid 1 stored in the machining fluid tank 3 is lower than the first conditional value or higher than the second conditional value, the pH is automatically controlled to fall within the predetermined range similarly to the fluid-quality Control apparatus 80A shown in FIG. 2. Furthermore, only by controlling the pH of the fluid-quality control target fluid 1 in the machining fluid tank 3, it is possible to prepare the water-containing machining fluid that has high electric-discharge stability during the electric-discharge machining and that makes it difficult to corrode the workpiece from the fluid-quality control target fluid 1. It is unnecessary for the fluid-quality control apparatus 80B to measure the conductivity of the fluid-quality control target fluid 1 using the conductivity meter or the like in the process of controlling the fluid quality of the fluid-quality control target fluid 1. This can dispense with means for measuring the conductivity. Accordingly, a cost required to prepare the water-containing machining fluid and a manufacturing cost or a running cost of the fluid-quality control apparatus 80B itself can be easily reduced.

If the non-recycle, unused water-containing machining fluid is to be prepared from the freshwater such as the running water, the industrial water or the ground water, the freshwater the impurity cations of which are mainly Na⁺ such as the running water can be supplied only to the OH⁻ type anion exchange resin column 8 without being supplied to the H⁺ type cation exchange resin column 17.

Furthermore, by allowing the control unit 70B (fluid-quality control unit 68B) to control the operations of the pump 31 and the channel switching unit 35, the fluid-quality control target fluid 1 can be supplied only to the OH⁻ type anion exchange resin column 8. Thanks to this, the following technical advantages can be attained.

As already explained, the pH of the fluid-quality control target fluid stored in the machining fluid tank 3 is gradually lower if carbon dioxide contained in the air is dissolved into the fluid even without performing the electric-discharge machining. Such a change in fluid quality can be dealt with by supplying the fluid-quality control target fluid 1 only to the OH⁻ type anion exchange resin column 8. Consequently, a cost required to prepare the water-containing machining fluid having the desired fluid quality can be easily reduced. The conditional value (the third conditional value) based on which it is determined whether to supply the fluid-quality control target fluid 1 only to the OH⁻ type anion exchange resin column 8 when the electric-discharge machining is not being performed can be set either equal to the first conditional value or different therefrom according to a performance of the OH⁻ type anion exchange resin column 8 and the like. The third conditional value is stored in the storage unit 67 similarly to the first and the second conditional values.

Fourth Embodiment

The fluid-quality control apparatus according to the present invention can include an electrolytic-water producing unit besides the electrolyte solutionizing unit and the purifying unit.

Figure 5:
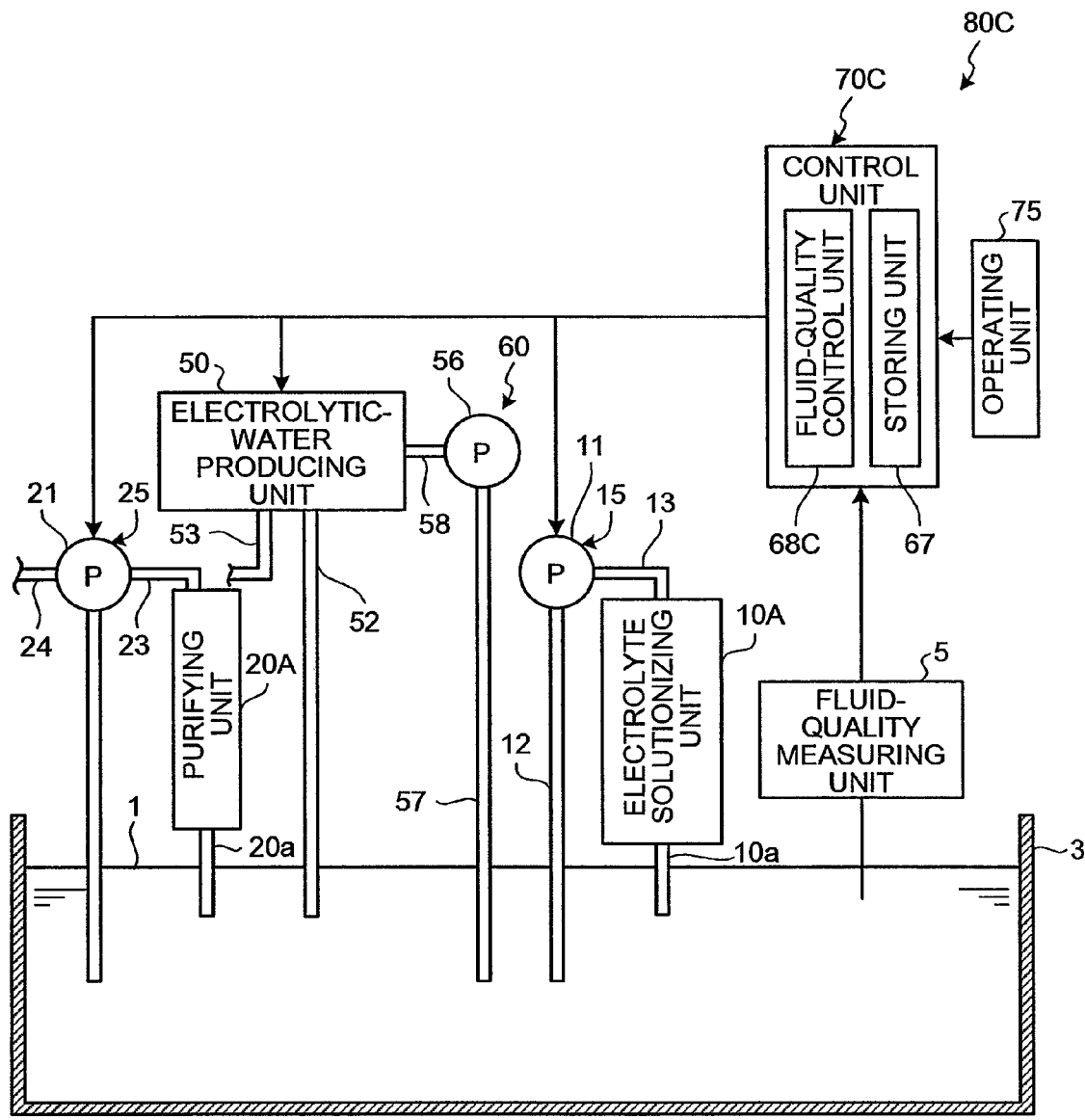
FIG. 5 is a schematic block diagram of one example of the fluid-quality control apparatus according to the present invention that includes an electrolytic-water producing unit.

FIG. 5 is a schematic block diagram of one example of the fluid-quality control apparatus according to the present invention that includes the electrolytic-water producing unit. As evident from comparison of FIG. 5 with FIG. 2, a fluid-quality control apparatus 80C is configured so that an electrolytic-water producing unit 50 and a second fluid-quality control target fluid supply unit 60 are added to the fluid-quality control apparatus 80A shown in FIG. 2. Among the constituent elements shown in FIG. 5, those common to the constituent elements shown in FIG. 2 are denoted by the same reference numerals, respectively and will not be explained herein.

The electrolytic-water producing unit 50 electrolyzes water and produces alkaline water and an acidic water. On an anode side, a reaction represented by the following formula (5) proceeds to produce the acidic water. On a cathode side, a reaction represented by the following formula (6) proceeds to produce the alkaline water. Such the electrolytic-water producing unit 50 can be constituted by a commercially available electrolytic water producing apparatus, e.g., an alkaline and acidic water ionizer manufactured by AQUA SYSTEM Co., Ltd. or an alkaline and acidic water ionizer manufactured by Matsushita Electric Works, Ltd.

$$2H_2O \rightarrow O_2 + 4H^+ + 4e^- \quad (5)$$

$$2H_2O + 2e^- \rightarrow H_2 + 2OH^- \quad (6)$$

Two drain pipes 52 and 53 are connected to the electrolytic-water producing unit 50. The alkaline water produced by the electrolytic-water producing unit 50 is supplied to the machining fluid tank 3 through the drain pipe 52. The acidic water produced by the electrolytic-water producing unit 50 can be either disposed of through the drain pipe 53 or stored in a desired storage tank. The acidic water can be used for neutralizing the fluid-quality control target fluid 1 or the like when the fluid-quality control target fluid 1 within the machining fluid tank 3 is replaced.

The second fluid-quality control target fluid supply unit 60 includes a pump 56, a water intake pipe 57, and a water supply pipe 58. An operation of the pump 56 is controlled by a fluid-quality control unit 68C that constitutes a control unit 70C. The water intake pipe 57 has one end arranged within the machining fluid tank 3 and the other end connected to the pump 56. The water supply pipe 58 has one end connected to the pump 56 and the other end connected to the electrolytic-water producing unit 50. The second fluid-quality control target fluid supply unit 60 supplies the fluid-quality control target fluid 1 within the machining fluid tank 3 to the electrolytic-water producing unit 50, while being controlled by the fluid-quality control unit 68C.

In the fluid-quality control apparatus 80C that additionally includes the electrolytic-water producing unit 50 and the second fluid-quality control target fluid supply unit 60, if pH measured by the fluid-quality measuring unit 5 is lower than the first conditional value (which is the first conditional value stored in the storage unit 67), the control unit 700 (fluid-quality control unit 68C) controls the first supply unit 15 and the second fluid-quality control target fluid supply unit 60 to operate to cause transformation of the fluid-quality control target fluid 1 into the electrolyte solution to proceed. If the pH measured by the fluid-quality measuring unit 5 is higher than the second conditional value (which is the second conditional value stored in the storage unit 67), the control unit 70C (fluid-quality control unit 68C) controls the second supply unit 25 to operate to cause purification of the fluid-quality control target fluid 1 to proceed.

In the fluid-quality control apparatus 80C thus configured, if the pH of the fluid-quality control target fluid 1 stored in the machining fluid tank 3 is lower than the first conditional value or higher than the second conditional value, the pH is automatically controlled to fall within the predetermined range similarly to the fluid-quality control apparatus 80A shown in FIG. 2. Furthermore, only by controlling the pH of the fluid-quality control target fluid 1 in the machining fluid tank 3, it is possible to prepare the water-containing machining fluid that has high electric-discharge stability during the electric-discharge machining and that makes it difficult to corrode the workpiece from the fluid-quality control target fluid 1. It is unnecessary for the fluid-quality control apparatus 80C to measure the conductivity of the fluid-quality control target fluid 1 using the conductivity meter or the like in the process of controlling the fluid quality of the fluid-quality control target fluid 1. This can dispense with means for measuring the conductivity. Accordingly, a cost required to prepare the water-containing machining fluid and a manufacturing cost or a running cost of the fluid-quality control apparatus 80C itself can be easily reduced.

A change in the fluid quality of the fluid-quality control target fluid 1 resulting from dissolution of carbon dioxide in the air into the fluid-quality control target fluid 1 can be dealt with by causing the control unit 70C to control the electrolytic-water producing unit 50 and the second fluid-quality control target fluid supply unit 60 to operate without causing the electrolyte solutionizing unit 10A and the purifying unit 20A to operate. Consequently, a cost required to prepare the water-containing machining fluid having the desired fluid quality can be easily reduced. The conditional value (the third conditional value) based on which it is determined whether to electrolyze the fluid-quality control target fluid 1 when the electric-discharge machining is not being performed can be set either equal to the first conditional value or different therefrom according to a performance of an instrument used for electrolysis and the like. Furthermore, pH of the alkaline water produced by the electrolytic-water producing unit 50 is relatively high. Due to this, if the pH of the fluid-quality control target fluid 1 is lower than the first conditional value, the control unit 70C controls not only the electrolyte solutionizing unit 10A but also the electrolytic-water producing unit 50 to operate. It is thereby possible to reduce a time required to set the pH of the fluid-quality control target fluid 1 to be equal to or higher than the conditional value. The third conditional value is stored in the storage unit 67 similarly to the first and the second conditional values.

Fifth Embodiment

An electric-discharge machining apparatus according to the present invention includes the fluid-quality control apparatus according to the present invention. If the electric-discharge machining apparatus needs the fluid-quality control apparatus, constituent elements of the electric-discharge machining apparatus other than the fluid-quality control apparatus are not limited to specific ones.

Figure 6:
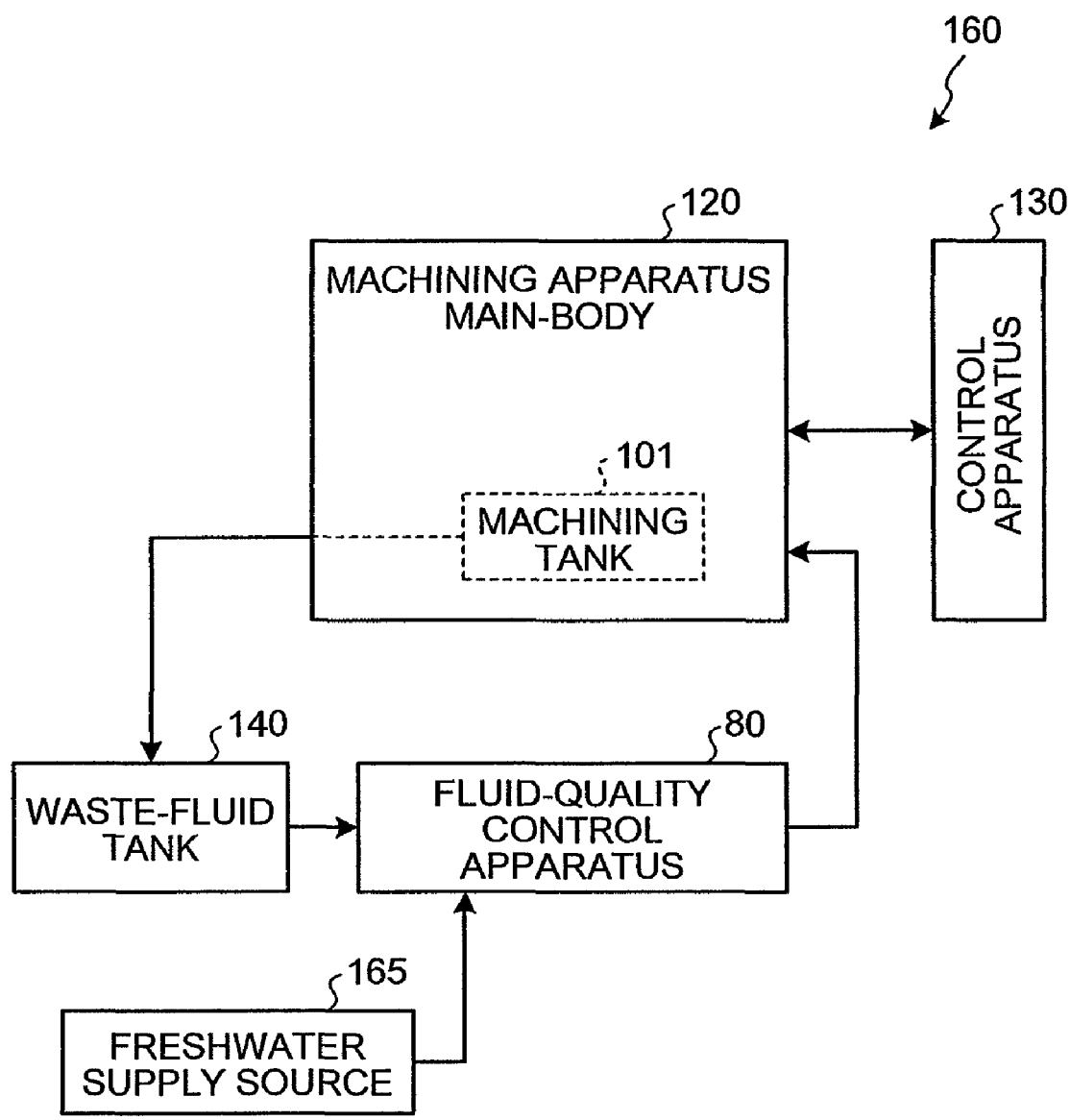
FIG. 6 is a schematic block diagram of a configuration of an electric-discharge machining apparatus according to the present invention.

FIG. 6 is a schematic block diagram of a configuration of the electric-discharge machining apparatus according to the present invention. As shown in FIG. 6, an electric-discharge machining apparatus 160 according to the present invention includes a machining apparatus main-body 120 that subjects a workpiece to electric-discharge machining, a control apparatus 130 that controls an operation of the machining apparatus main-body 120, and a waste-fluid tank 140 that stores the used water-containing machining fluid after being used in the machining apparatus main-body 120.

The machining apparatus main-body 120 is a machining apparatus main-body included in, for example, wire electric-discharge machining apparatus or a die sinking electric-discharge machining apparatus. The machining apparatus main-body 120 includes a machining tank 101 that stores the water-containing machining fluid. The used water-containing machining fluid stored in the machining tank 101 is supplied to the waste-fluid tank 140, in which solid foreign matters are removed from the fluid and the resultant fluid is supplied to a fluid-quality control apparatus 80. A fluid quality of the used water-containing machining fluid supplied to the fluid-quality control apparatus 80 is controlled by the fluid-quality control apparatus 80 as already explained. Thereafter, the resultant machining fluid is supplied again to the machining apparatus main-body 120 to be used during the electric-discharge machining. If the non-recycled, unused water-containing machining fluid is to be prepared by the fluid-quality control apparatus 80, a supply source 165 of the freshwater such as the running water, the industrial water or ground water is connected to the fluid-quality control apparatus 80.

Figure 7:
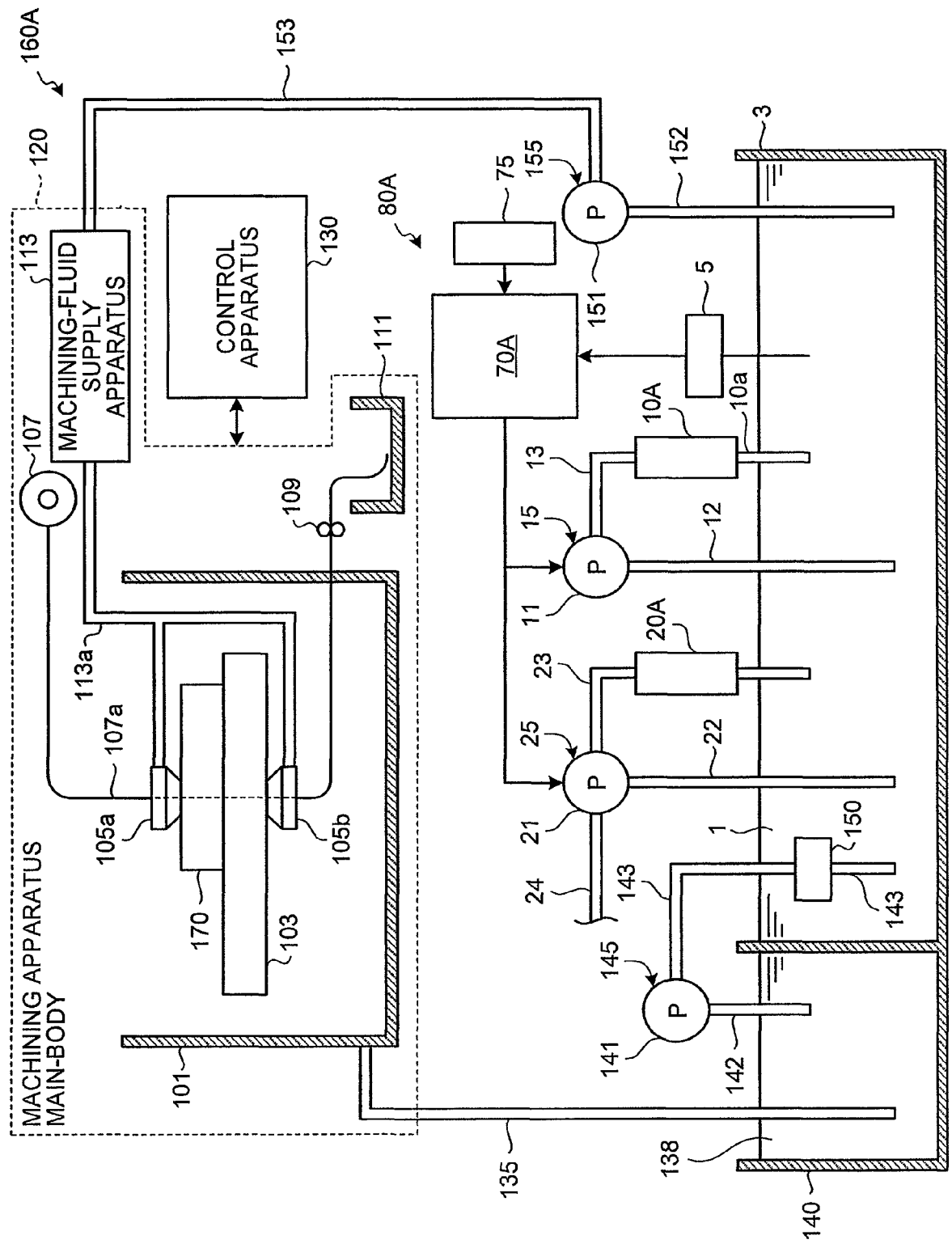
FIG. 7 is a schematic block diagram of one example of the electric-discharge machining apparatus according to the present invention.

FIG. 7 is a schematic block diagram of one example of the electric-discharge machining apparatus according to the present invention. An electric-discharge machining apparatus 160A shown in FIG. 7 is a wire electric-discharge machining apparatus that includes the fluid-quality control apparatus 80A explained in the second embodiment.

The machining apparatus main-body 120 in the electric-discharge machining apparatus 160A includes the machining tank 101 that temporarily stores the used water-containing machining fluid, a table 103 arranged within the machining tank 101, and a pair of nozzles 105a and 105b fixedly arranged above and below the table 103 within the machining tank 101, respectively. The machining apparatus main-body 120 also includes a wire bobbin 107 arranged above the table 103, a taking-up roll 109 arranged outside the machining tank 101, and a recovery container 111 arranged outside the machining tank 101. Furthermore, the machining apparatus main-body 120 includes a machining-fluid supply apparatus 113 that supplies the water-containing machining fluid to the respective nozzles 105a and 105b, a machining-fluid supply pipe 113a connected to the respective nozzles 105a and 105b, a table drive (not shown), a power supply apparatus (not shown), and the like.

The table 103 is driven by the table drive to be moved on an X-Y plane (horizontal plane), and a workpiece 170 is disposed on the table 103. Each of the paired nozzles 105a and 105b guides a wire electrode 107a drawn out from the wire bobbin 107 to a predetermined position. In addition, each of the nozzles 105a and 105b injects the water-containing machining fluid supplied from the machining-fluid supply apparatus 113 through the machining-fluid supply pipe 113a toward the workpiece 170 during the electric-discharge machining, and interposes the water-containing machining fluid between the wire electrode 107a and the workpiece 170. During the electric-discharge machining, a high frequency pulsed voltage is applied to the wire electrode 107a and the workpiece 170 from the power supply apparatus, thereby generating an electric discharge between the wire electrode 107a and the workpiece 170. The machining apparatus main-body 120 engraves the workpiece 170 little by little in an infinitesimal amount by the electric discharge, thereby machining the workpiece 170 into a desired shape.

The control apparatus 130 includes a storage unit (not shown) that stores numerical control data used for the electric-discharge machining on the workpiece 170 and a control unit (not shown) that controls operations of the machining-fluid supply apparatus 113, the table drive, and the power supply apparatus, respectively. The control apparatus 130 controls an operation of the machining apparatus main-body 120 based on the numerical data.

A used-water-containing machining fluid 138 used to discharge-machine the workpiece 170 by the machining apparatus main-body 120 contains machining waste generated by the electric-discharge machining and metal ions generated from the wire electrode 107a or the workpiece 170 during the electric-discharge machining. Due to this, the used-water-containing machining fluid 138 is supplied from the machining tank 101 to the waste-fluid tank 140 through a drain pipe 135 and temporarily stored in the waste-fluid tank 140. The waste-fluid tank 140 is equipped with a water supply unit 145 that supplies the used-water-containing machining fluid 138 to the fluid-quality control apparatus 80A. The water supply unit 145 includes a pump 141, a water intake pipe 142, and a water supply pipe 143. The water intake pipe 142 has one end arranged within the waste-fluid tank 140 and the other end connected to the pump 141. The water supply pipe 143 has one end connected to the pump 141 and the other end arranged within the machining fluid tank 3 of the fluid-quality control apparatus 80A. A filter 150 that removes the solid foreign matters from the used-water-containing machining fluid 138 is provided halfway along the water supply pipe 143.

If an amount of the used-water-containing machining fluid 138 stored in the waste-fluid tank 140 exceeds a predetermined amount, then the water supply unit 145 operates to supply this used water-containing machining fluid into the machining fluid tank 3 of the fluid-quality control apparatus 80A. The used water-containing machining fluid supplied into the machining fluid tank 3 corresponds to the fluid-quality control target fluid. In FIG. 7, therefore, the fluid in the machining fluid tank 3 is denoted by reference numeral 1. The fluid in the machining fluid tank 3 will be referred to as "fluid-quality control target fluid 1" hereinafter.

The fluid-quality control apparatus 80A controls the fluid quality of the fluid-quality control target fluid 1 within the machining fluid tank 3, and prepares the water-containing machining fluid that has high electric-discharge stability during the electric-discharge machining and that makes it difficult to corrode the workpiece. Since the detailed operation of the fluid-quality control apparatus 80A is already explained in the second embodiment, it will not be explained herein.

The water-containing machining fluid prepared from the used-water-containing machining fluid 138 by the fluid-quality control apparatus 80A is supplied to the machining-fluid supply apparatus 113 of the machining apparatus main-body 120 by a water supply unit 155 to be recycled during the electric-discharge machining. The water supply unit 155 includes a pump 151, a water intake pipe 152 having one end arranged within the machining fluid tank 3 and the other end connected to the pump, and a water supply pipe 153 having one end connected to the pump 151 and the other end connected to the machining-fluid supply apparatus 113. The pump 151 operates either regularly or in response to an indication from the control apparatus 130, and supplies the water-containing machining fluid prepared within the machining fluid tank 3 to the machining-fluid supply apparatus 113.

The fluid-quality control apparatus 80A in the electric-discharge machining apparatus 160A thus configured is activated or stopped as follows. A user of the electric-discharge machining apparatus 160A operates the operating unit 75 of the fluid-quality control apparatus 80A, or the control apparatus 130 of the electric-discharge machining apparatus 160A controls the operation of the control unit 70A of the fluid-quality control apparatus 80A.

Figures 8, 9:
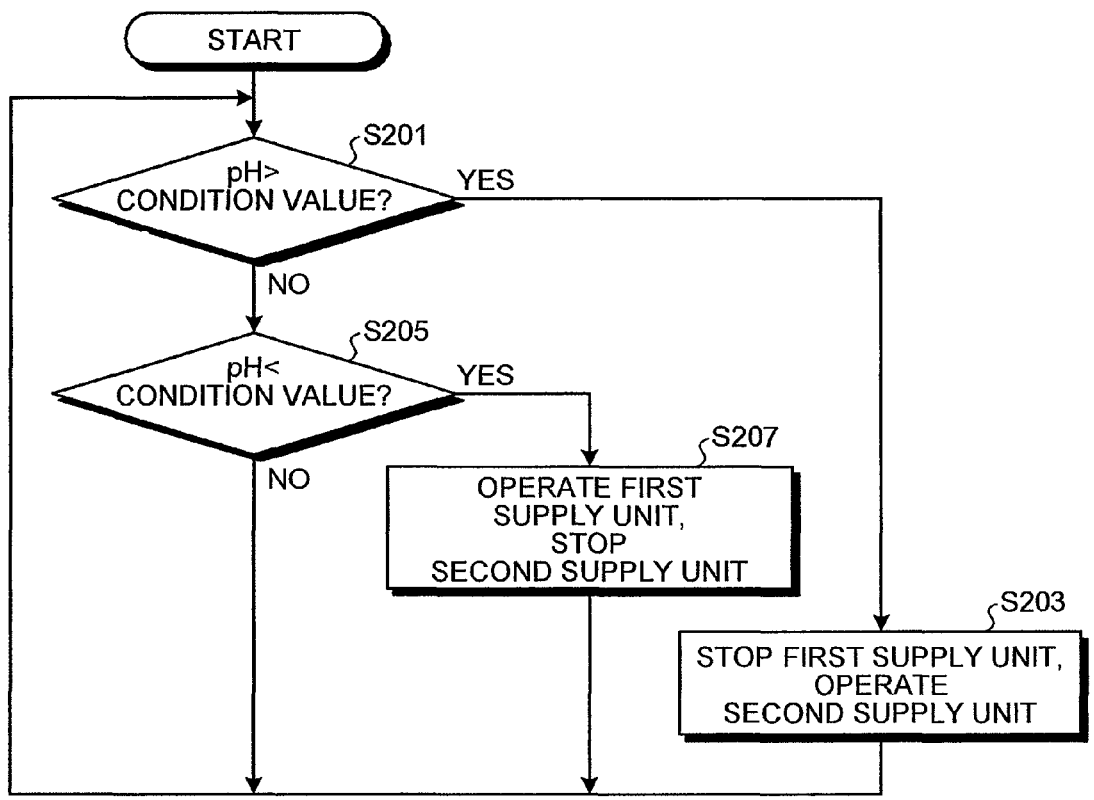
FIG. 8 is a flowchart of an operation of the fluid-quality control apparatus in the electric-discharge machining apparatus shown in FIG. 7.
FIG. 9 is a table of a list of the correspondence among pHs measured by a fluid-quality measuring unit, operating states of the electrolyte solutionizing unit, and those of the purifying unit when the fluid-quality control apparatus operates according to the flowchart shown in FIG. 8.

FIG. 8 is a flowchart of an operation of the fluid-quality control apparatus 80A in the electric-discharge machining apparatus 160A. FIG. 8 shows the operation of the fluid-quality control apparatus 80A if the first conditional value and the second conditional value (see the second embodiment) are set to an equal value (hereinafter, "conditional value"). As shown in FIG. 8, the activated fluid-quality control apparatus 80A executes step S201 of causing the fluid-quality control unit 68A (see FIG. 2) to determine whether the pH measured by the fluid-quality measuring unit 5 (see FIG. 7) is higher than the conditional value. If it is determined that the pH is higher than the conditional value, the processing goes to step S203, at which the fluid-quality control apparatus 80A causes the second supply unit 25 (see FIG. 7) to operate while stopping the first supply unit 15. Following the operation of the second supply unit 25, the purifying unit 20A (see FIG. 7) purifies the fluid-quality control target fluid 1.

If it is determined at step S201 that the pH is not higher than the conditional value, the processing goes to step S205, at which it is determined whether the pH is lower than the conditional value. If it is determined that the pH is lower than the conditional value, the processing goes to step S207, at which the fluid-quality control apparatus 80A causes the first supply unit 15 to operate while stopping the second supply unit 25. Following the operation of the first supply unit 15, the electrolyte solutionizing unit 10A transforms the fluid-quality control target fluid 1 (see FIG. 7) into the electrolyte solution. If it is determined at step S205 that the pH is not lower than the conditional value, the processing returns to step S201.

FIG. 9 is a table of a list of the correspondence among pHs measured by the fluid-quality measuring unit, operating states of the electrolyte solutionizing unit 10A, and those of the purifying unit 20A (see FIG. 7) when the fluid-quality control apparatus 80A operates according to the flowchart shown in FIG. 8. As shown in FIG. 9, if the pH measured by the fluid-quality measuring unit 5 is higher than the conditional value, the fluid-quality control apparatus 80A causes the purifying unit 20A to operate while stopping the electrolyte solutionizing unit 10A. If the pH measured by the fluid-quality measuring unit 5 is lower than the conditional value, the fluid-quality control apparatus 80A causes the electrolyte solutionizing unit 10A to operate while stopping the purifying unit 20A. Thus, the fluid-quality control apparatus 80A controls the fluid quality of the fluid-quality control target fluid 1 and prepares the water-containing machining fluid.

As explained in the second embodiment, the fluid-quality control apparatus 80A is an apparatus that does not need to measure the conductivity of the fluid-quality control target fluid 1 by the conductivity meter or the like in the preparation of the water-containing machining fluid from the fluid-quality control target fluid 1. Therefore, the electric-discharge machining apparatus 160A that includes the fluid-quality control apparatus 80A does not need to provide the fluid-quality control apparatus 80A with means for measuring the conductivity. Accordingly, a cost required for preparing the water-containing machining fluid and a manufacturing cost or a running cost of each of the fluid-quality control apparatus 80A and the electric-discharge machining apparatus 160A can be easily reduced.

Sixth Embodiment

Figure 10:
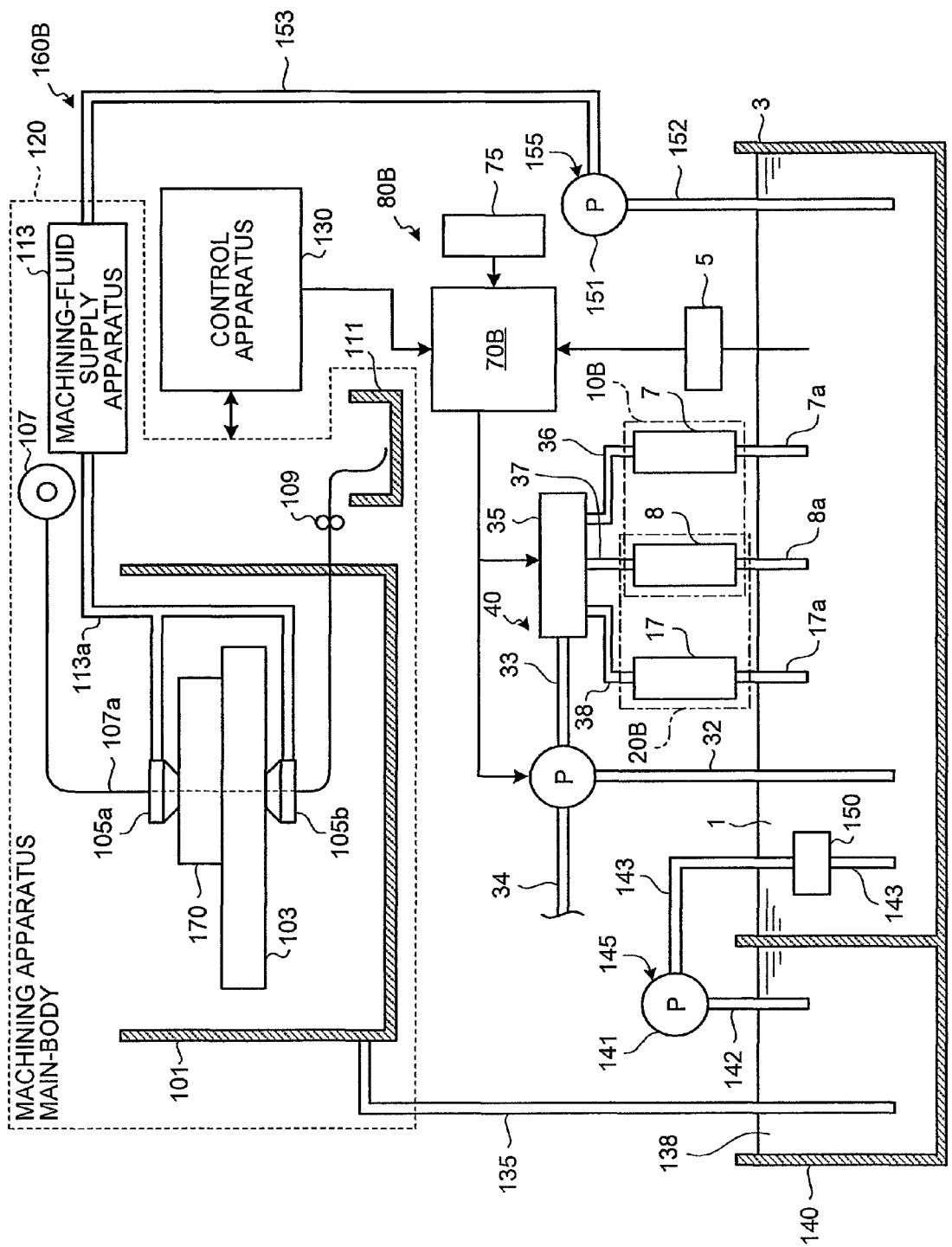
FIG. 10 is a schematic block diagram of another example of the electric-discharge machining apparatus according to the present invention.

FIG. 10 is a schematic block diagram of another example of the electric-discharge machining apparatus according to the present invention. An electric-discharge machining apparatus 160B shown in FIG. 10 is a wire electric-discharge machining apparatus that includes the fluid-quality control apparatus 80B explained in the third embodiment. The electric-discharge machining apparatus 160B is equal in configuration to the electric-discharge machining apparatus 160A shown in FIG. 7 except for the following respect as well as the fluid-quality control apparatus 80B. Information indicating whether the electric-discharge machining is being performed is transmitted from the control apparatus 130 to the control unit 70B. All the constituent elements shown in FIG. 10 are already explained with reference to FIG. 4 or 7. Therefore, these constituent elements are denoted by the same reference numerals as those used in FIG. 4 or 7, and will not be explained herein.

Figures 11, 12:
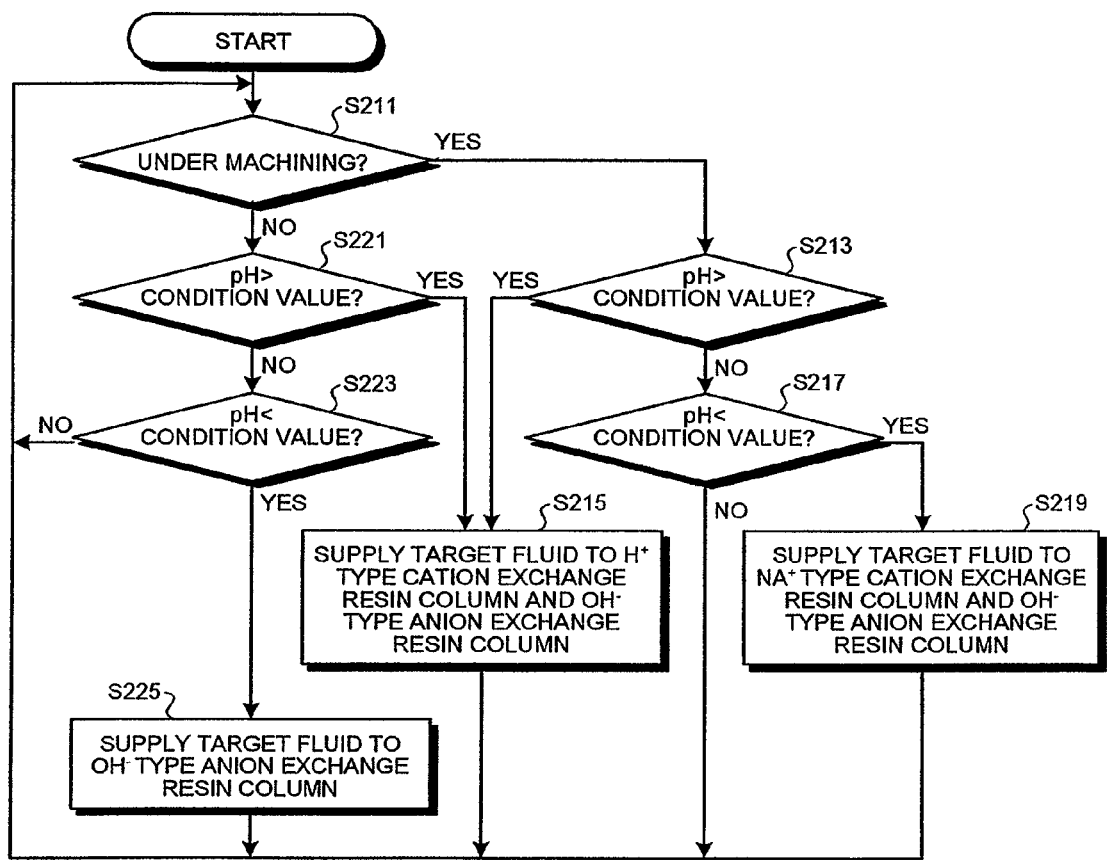
FIG. 11 is a flowchart of an operation of the fluid-quality control apparatus in the electric-discharge machining apparatus shown in FIG. 10.
FIG. 12 is a table of a list of the correspondence among pHs measured by the fluid-quality measuring unit, operating states of the electrolyte solutionizing unit, those of the purifying unit, and those of an $OH^-$ forming unit when the fluid-quality control apparatus operates according to the flowchart shown in FIG. 11.

FIG. 11 is a flowchart of an operation of the fluid-quality control apparatus 80B in the electric-discharge machining apparatus 160B. FIG. 11 shows the operation of the fluid-quality control apparatus 80B if the first conditional value and the second conditional value (see the third embodiment) are set to an equal value (hereinafter, "conditional value"). As shown in FIG. 11, the activated fluid-quality control apparatus 80B executes step S211 of determining whether the electric-discharge machining is being performed based on the information from the control apparatus 130 (see FIG. 10). If the electric-discharge machining is being performed, the processing goes to step S213, at which the fluid-quality control apparatus 80B determines whether the pH measured by the fluid-quality measuring unit 5 (see FIG. 10) is higher than the conditional value. If the fluid-quality control apparatus 80B determines that the pH is higher than the conditional value, the processing goes to step S215, at which the fluid-quality control apparatus 80B supplies the fluid-quality control target fluid 1 to the $H^+$ type cation exchange resin column 17 and the $OH^-$ type anion exchange resin column 8 (see FIG. 10). The purifying unit 20B (see FIG. 10) thereby purifies the fluid-quality control target fluid 1.

If the fluid-quality control apparatus 80B determines at step S213 that the pH is not higher than the conditional value, the processing goes to step S217, at which the fluid-quality control apparatus 80B determines whether the pH is lower than the conditional value. If the fluid-quality control apparatus 80B determines at step S217 that the pH is lower than the conditional value, the processing goes to step S219, at which the fluid-quality control apparatus 80B supplies the fluid-quality control target fluid 1 to the $Na^+$ type cation exchange resin column (see FIG. 10) and the $OH^-$ type anion exchange resin column 8. The electrolyte solutionizing unit 10B (see FIG. 10) thereby transforms the fluid-quality control target fluid 1 into the electrolyte solution. If the fluid-quality control apparatus 80B determines at step S217 that the pH is not lower than the conditional value, the processing returns to step S211.

If the fluid-quality control apparatus 80B determines at step S211 that the electric-discharge machining is not being performed, the processing goes to step S221, at which the fluid-quality control apparatus 80B determines whether the pH measured by the fluid-quality measuring unit 5 is higher than the conditional value. If the fluid-quality control apparatus 80B determines at step S221 that the pH is higher than the conditional value, the processing goes to step S215. At step S215, the fluid-quality control apparatus 80B supplies the fluid-quality control target fluid 1 to the $H^+$ type cation exchange resin column 17 and the $OH^-$ type anion exchange resin column 8. The purifying unit 20B thereby purifies the fluid-quality control target fluid 1.

If the fluid-quality control apparatus 80B determines at step S221 that the pH is not higher than the conditional value, the processing goes to step S223, at which the fluid-quality control apparatus 80B determines whether the pH is lower than the conditional value. If the fluid-quality control apparatus 80B determines at step S223 that the pH is lower than the conditional value, the processing goes to step S225, at which the fluid-quality control apparatus 80B supplies the fluid-quality control target fluid 1 to the $OH^-$ type anion exchange resin column 8. The pH of the fluid-quality control target fluid 1 is thereby regulated to an alkali side. If the fluid-quality control apparatus 80B determines at step S223 that the pH is not lower than the conditional value, the processing returns to step S211.

FIG. 12 is a table of a list of the correspondence among pHs measured by the fluid-quality measuring unit, operating states of the electrolyte solutionizing unit 10B, those of the purifying unit 20B (see FIG. 7), and those of an $OH^-$ forming unit when the fluid-quality control apparatus 80B operates according to the flowchart shown in FIG. 11. The "$OH^-$ forming unit" means the $OH^-$ type anion exchange resin column 8 when the fluid-quality control target fluid 1 is supplied not to the $Na^+$ type cation exchange resin column 7 and the $H^+$ type cation exchange resin column 17 shown in FIG. 10 but only to the $OH^-$ type anion exchange resin column 8.

As shown in FIG. 12, if the pH measured by the fluid-quality measuring unit 5 is higher than the conditional value irrespectively of whether the electric-discharge machining is being performed, the fluid-quality control apparatus 80B causes the purifying unit 20B to operate while stopping the electrolyte solutionizing unit 10B and the $OH^-$ forming unit. If the electric-discharge machining is being performed and the pH measured by the fluid-quality measuring unit 5 is lower than the conditional value, the fluid-quality control apparatus 80B causes the electrolyte solutionizing unit 10B to operate while stopping the purifying unit 20B and the $OH^-$ forming unit. If the electric-discharge machining is not being performed and the pH measured by the fluid-quality measuring unit 5 is lower than the conditional value, the fluid-quality control apparatus 80B causes the $OH^-$ forming unit to operate while stopping the electrolyte solutionizing unit 10B and the purifying unit 20B. Thus, the fluid-quality control apparatus 80B controls the fluid quality of the fluid-quality control target fluid 1 and prepares the water-containing machining fluid.

As explained in the third embodiment, the fluid-quality control apparatus 80B is an apparatus that does not need to measure the conductivity of the fluid-quality control target fluid 1 by the conductivity meter or the like in the preparation of the water-containing machining fluid from the fluid-quality control target fluid 1. Therefore, the electric-discharge machining apparatus 160B that includes the fluid-quality control apparatus 80B does not need to provide the fluid-quality control apparatus 80B with means for measuring the conductivity. Accordingly, a cost required for preparing the water-containing machining fluid and a manufacturing cost or a running cost of each of the fluid-quality control apparatus 80B and the electric-discharge machining apparatus 160B can be easily reduced.

Seventh Embodiment

Figure 13:
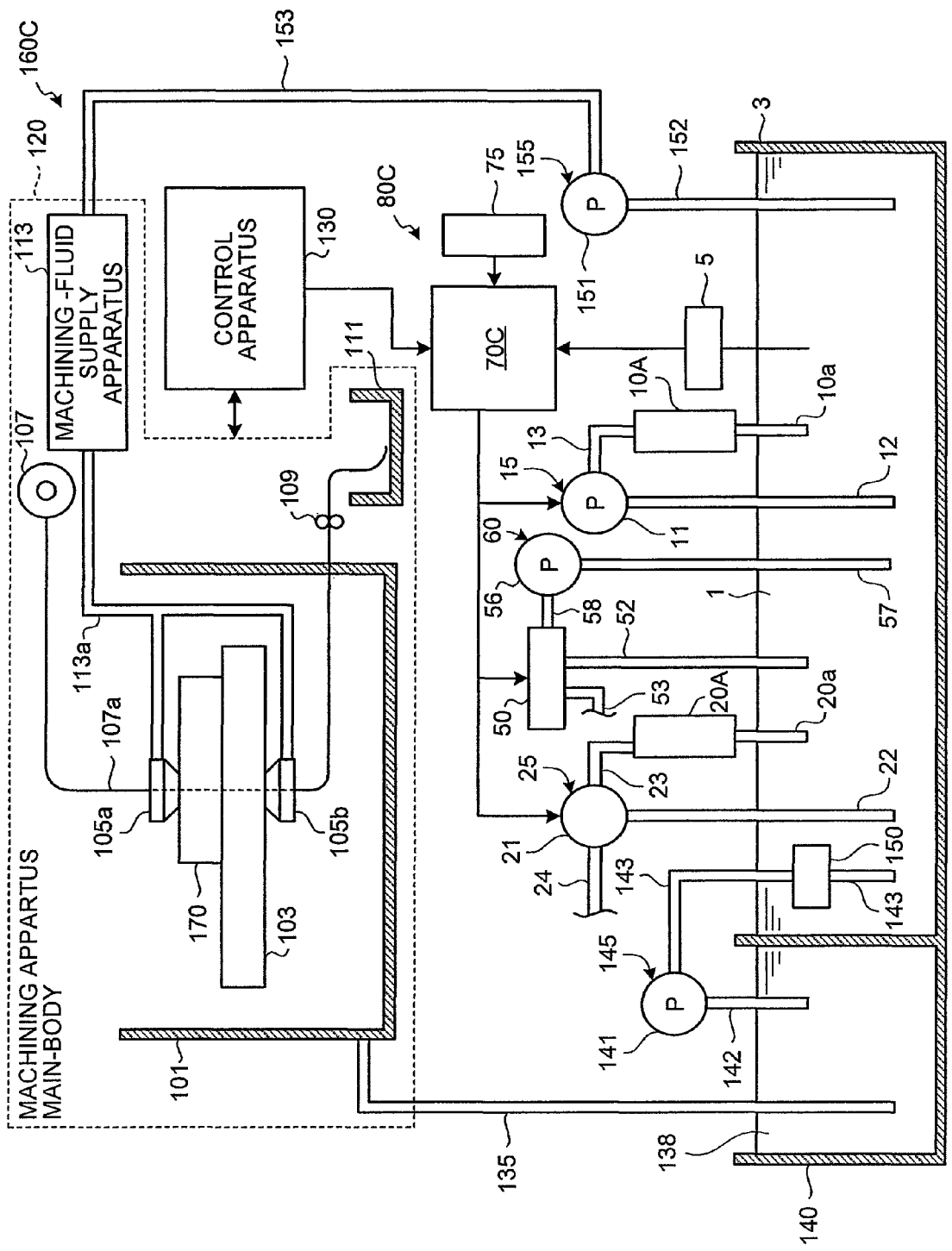
FIG. 13 is a schematic block diagram of still another example of the electric-discharge machining apparatus according to the present invention.

FIG. 13 is a schematic block diagram of still another example of the electric-discharge machining apparatus according to the present invention. An electric-discharge machining apparatus 160C shown in FIG. 13 is a wire electric-discharge machining apparatus that includes the fluid-quality control apparatus 80C explained in the fourth embodiment. The electric-discharge machining apparatus 160C is equal in configuration to the electric-discharge machining apparatus 160B shown in FIG. 10 except for the fluid-quality control apparatus 80C. All the constituent elements shown in FIG. 13 are already explained with reference to FIG. 5 or 7. Therefore, these constituent elements are denoted by the same reference numerals as those used in FIG. 4 or 7, and will not be explained herein. Although not shown in FIG. 13, the acidic water produced by the electrolytic-water producing unit 50 is supplied to the waste-fluid tank 140 through the drain pipe 53.

Figures 14, 15:
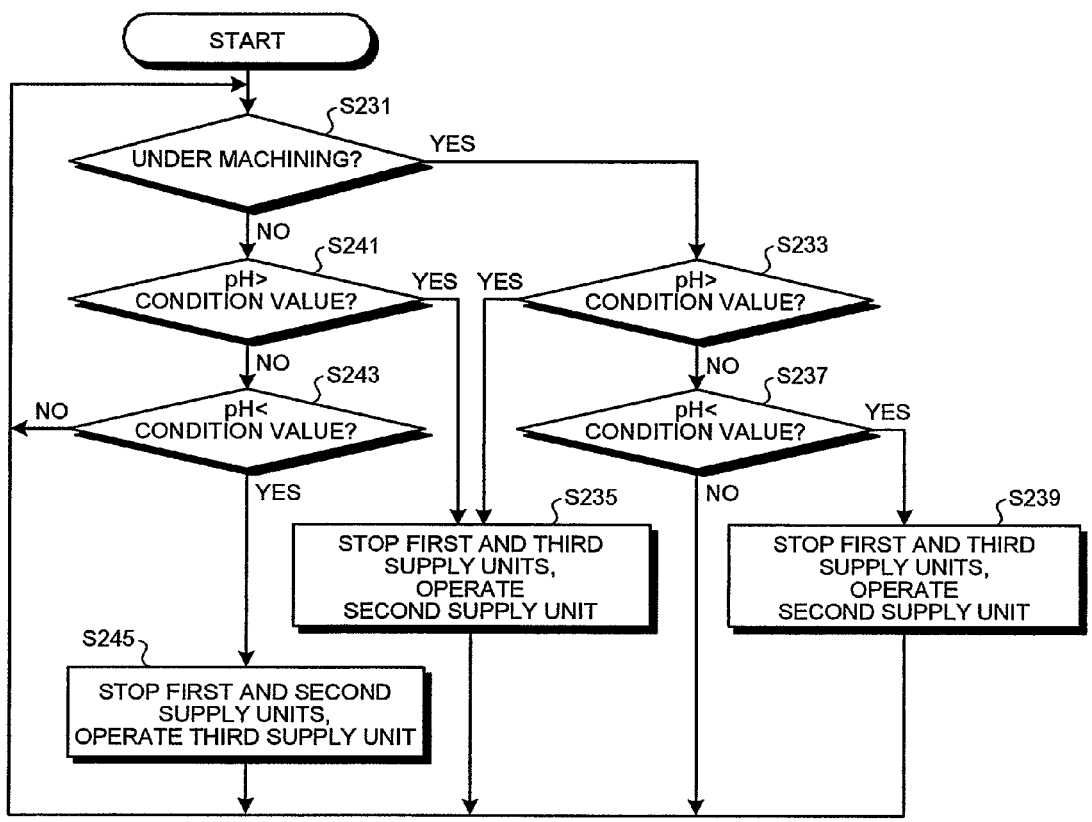
FIG. 14 is a flowchart of an operation of the fluid-quality control apparatus in the electric-discharge machining apparatus shown in FIG. 13.
FIG. 15 is a table of a list of the correspondence among pHs measured by the fluid-quality measuring unit, operating states of the electrolyte solutionizing unit, those of the purifying unit, and those of an electrolytic-water producing unit when the fluid-quality control apparatus operates according to the flowchart shown in FIG. 14.

FIG. 14 is a flowchart of an operation of the fluid-quality control apparatus 80C in the electric-discharge machining apparatus 160C. FIG. 14 shows the operation of the fluid-quality control apparatus 80C if the first, second, and third conditional values (see the fourth embodiment) are set to an equal value (hereinafter, "conditional value"). As shown in FIG. 14, the activated fluid-quality control apparatus 80C executes step S231 of determining whether the electric-discharge machining is being performed based on the information from the control apparatus 130 (see FIG. 13). If the electric-discharge machining is being performed, the processing goes to step S233, at which the fluid-quality control apparatus 80C determines whether the pH measured by the fluid-quality measuring unit 5 (see FIG. 13) is higher than the conditional value. If the fluid-quality control apparatus 80C determines that the pH is higher than the conditional value, the processing goes to step S235. At step S235, the fluid-quality control apparatus 80C causes the second supply unit 25 (see FIG. 13) to operate while stopping the first supply unit 15 and the second fluid-quality control target fluid supply unit 60. The purifying unit 20A (see FIG. 13) thereby purifies the fluid-quality control target fluid 1.

If the fluid-quality control apparatus 80C determines at step S233 that the pH is not higher than the conditional value, the processing goes to step S237, at which the fluid-quality control apparatus 80C determines whether the pH is lower than the conditional value. If the fluid-quality control apparatus 80C determines at step S237 that the pH is lower than the conditional value, the processing goes to step S239. At step S239, the fluid-quality control apparatus 80B causes the first supply unit 15 and the second fluid-quality control target fluid supply unit 60 to operate while stopping the second supply unit 25. The electrolyte solutionizing unit 10A (see FIG. 13) thereby transforms the fluid-quality control target fluid 1 into the electrolyte solution. If the fluid-quality control apparatus 80C determines at step S237 that the pH is not lower than the conditional value, the processing returns to step S231.

If the fluid-quality control apparatus 80C determines at step S231 that the electric-discharge machining is not being performed, the processing goes to step S231, at which the fluid-quality control apparatus 80C determines whether the pH measured by the fluid-quality measuring unit 5 is higher than the conditional value. If the fluid-quality control apparatus 80C determines at step S241 that the pH is higher than the conditional value, the processing goes to step S235. At step S235, the fluid-quality control apparatus 80C causes the second supply unit 25 to operate while stopping the first supply unit 15 and the second fluid-quality control target fluid supply unit 60. The purifying unit 20A thereby purifies the fluid-quality control target fluid 1.

If the fluid-quality control apparatus 80C determines at step S241 that the pH is not higher than the conditional value, the processing goes to step S243, at which the fluid-quality control apparatus 80C determines whether the pH is lower than the conditional value. If the fluid-quality control apparatus 80C determines at step S243 that the pH is lower than the conditional value, the processing goes to step S245. At step S245, the fluid-quality control apparatus 80C causes the second fluid-quality control target fluid supply unit 60 to operate while stopping the first supply unit 15 and the second supply unit 25. The pH of the fluid-quality control target fluid 1 is thereby regulated to an alkali side. If the fluid-quality control apparatus 80C determines at step S243 that the pH is not lower than the conditional value, the processing returns to step S231.

FIG. 15 is a table of a list of the correspondence among pHs measured by the fluid-quality measuring unit, operating states of the electrolyte solutionizing unit 10A, those of the purifying unit 20A, and those of the electrolytic-water producing unit 50 (see FIG. 13) when the fluid-quality control apparatus 80C operates according to the flowchart shown in FIG. 14. As shown in FIG. 15, if the pH measured by the fluid-quality measuring unit 5 is higher than the conditional value irrespectively of whether the electric-discharge machining is being performed, the fluid-quality control apparatus 80C causes the purifying unit 20A to operate while stopping the electrolyte solutionizing unit 10A and the electrolytic-water producing unit 50. If the electric-discharge machining is being performed and the pH measured by the fluid-quality measuring unit 5 is lower than the conditional value, the fluid-quality control apparatus 80C causes the electrolyte solutionizing unit 10A and the electrolytic-water producing unit 50 to operate while stopping the purifying unit 20A. If the electric-discharge machining is not being performed and the pH measured by the fluid-quality measuring unit 5 is lower than the conditional value, the fluid-quality control apparatus 80C causes the electrolytic-water producing unit 50 to operate while stopping the electrolyte solutionizing unit 10A and the purifying unit 20A. Thus, the fluid-quality control apparatus 80C controls the fluid quality of the fluid-quality control target fluid 1 and prepares the water-containing machining fluid.

As explained in the fourth embodiment, the fluid-quality control apparatus 80C is an apparatus that does not need to measure the conductivity of the fluid-quality control target fluid 1 by the conductivity meter or the like in the preparation of the water-containing machining fluid from the fluid-quality control target fluid 1. Therefore, the electric-discharge machining apparatus 160C that includes the fluid-quality control apparatus 80C does not need to provide the fluid-quality control apparatus 80C with means for measuring the conductivity. Accordingly, a cost required for preparing the water-containing machining fluid and a manufacturing cost or a running cost of each of the fluid-quality control apparatus 80C and the electric-discharge machining apparatus 160C can be easily reduced.

The fluid-quality control method, the fluid-quality control apparatus, and the electric-discharge machining apparatus have been explained so far while referring to the embodiments. However, the present invention is not limited to the embodiments and various changes, modifications, combinations and the like can be made of the invention. For instance, the first fluid-quality control target fluid supply unit that supplies the fluid-quality control target fluid to the electrolyte solutionizing unit and the purifying unit can be constituted by one pump and one channel switching unit even if the electrolyte solutionizing unit and the purifying unit are constituted by separate ion exchange resin columns, respectively.

Furthermore, in the first to the seventh embodiments, the fluid-quality control method, the fluid-quality control apparatus, or the electric-discharge machining apparatus for measuring the pH of the fluid-quality control target fluid as the fluid quality of the fluid-quality control target fluid, and controlling the fluid quality (pH) of the fluid-quality control target fluid according to the pH has been explained. Alternatively, according to the present invention, the conductivity (specific resistance) of the fluid-quality control target fluid can be used as the fluid quality. In this alternative, the fluid-quality measuring unit in the fluid-quality control apparatus or the electric-discharge machining apparatus is, for example, the conductivity meter. In this case, the first, second, and third conditional values are appropriately set according to an allowable conductivity range for the water-containing machining fluid to be obtained from the fluid-quality control target fluid, the performance of the instrument used to control the fluid quality of the fluid quality target fluid, the fluid amount of the fluid-quality control target fluid, and the like. If the conductivity (specific resistance) of the fluid-quality control target fluid is used as the fluid quality, the pH measuring unit can be dispensed with in the preparation of the water-containing machining fluid having the desired fluid quality used in the electric-discharge machining.

Industrial Applicability

As explained so far, the fluid-quality control method, the fluid-quality control apparatus, and the electric-discharge machining apparatus according to the present invention can easily reduce the cost required to prepare the water-containing machining fluid used in the electric-discharge machining, and the manufacturing cost or running cost of each of the fluid-quality control apparatus and the electric-discharge machining apparatus. Therefore, the fluid-quality control method, the fluid-quality control apparatus, and the electric-discharge machining apparatus according to the present invention are effective to suppress manufacturing costs of various products manufactured by the electric-discharge machining, or particularly various products manufactured using the hard metal material or the non-passivated metal material.

The invention claimed is:
1. A fluid-quality control method of changing fluid quality of used water-based machining fluid or undiluted fluid into fluid quality of water-based machining fluid for electric-discharge machining, the fluid-quality control method comprising:
- measuring fluid-quality value of target fluid of which the fluid quality is to be controlled; and
- controlling the fluid quality, including
  - electrolyte-solutionizing the target fluid, when the measured fluid-quality value is lower than a first condition value, by substituting an impurity anion contained in the target fluid with a predetermined anion and substituting an impurity cation contained in the target fluid with a predetermined cation; and
  - purifying the target fluid, when the measured fluid-quality value is higher than a second condition value that is equal to or higher than the first condition value, wherein
- the measuring and the controlling are repeated, so that the fluid-quality value of the target fluid falls within a predetermined range, to make the target fluid into electrolyte solution with a correlation between pH and conductivity.

2. The fluid-quality control method according to claim 1, wherein
the fluid-quality value is pH value of the target fluid.

3. The fluid-quality control method according to claim 2, wherein
the predetermined anion is a hydroxide ion, and
the predetermined cation is either one of an alkali metal ion and an alkaline-earth metal ion.

4. The fluid-quality control method according to claim 3, further comprising:
- electrolyzing the target fluid, when the measured pH value is lower than a third condition value that is equal to or different from the first condition value; and
- adding alkaline water produced by the electrolyzing into the target fluid.

5. The fluid-quality control method according to claim 1, wherein
the purifying includes
- substituting the impurity anion contained in the target fluid with a hydroxide ion; and
- substituting the impurity cation contained in the target fluid with a hydrogen ion.

6. The fluid-quality control method according to claim 1, wherein
the pH value of the target fluid falls within a range between 8.5 and 10.5.

7. A fluid-quality control apparatus that fabricates water-based machining fluid for electric-discharge machining by controlling fluid quality of used water-based machining fluid or undiluted fluid that is raw material for the water-based machining fluid for the electric-discharge machining, the fluid-quality control apparatus comprising:
- a fluid-quality measuring unit that measures fluid-quality value of target fluid of which the fluid quality is to be controlled;
- an electrolyte solutionizing unit that makes the target fluid into electrolyte solution with a correlation between pH and conductivity by substituting an impurity anion contained in the target fluid with a predetermined anion and substituting an impurity cation contained in the target fluid with a predetermined cation;
- a purifying unit that purifies the target fluid;
- a first target-fluid supply unit that supplies the target fluid to either one of the electrolyte solutionizing unit and the purifying unit; and
- a control unit that controls operation of the first target-fluid supply unit based on the fluid quality value measured by the fluid-quality measuring unit, wherein the control unit includes
- a storing unit that stores a first condition value and a second condition value that is equal to or higher than the first condition value; and
- a fluid-quality control unit that controls the operation of the first target-fluid supply unit based on a magnitude relationship between the fluid quality value measured by the fluid-quality measuring unit and each of the first condition value and the second condition value.

8. The fluid-quality control apparatus according to claim 7, wherein
the fluid-quality value is pH value of the target fluid.

9. The fluid-quality control apparatus according to claim 8, wherein
the predetermined anion is a hydroxide ion, and
the predetermined cation is either one of an alkali metal ion and an alkaline-earth metal ion.

10. The fluid-quality control apparatus according to claim 8, wherein
the purifying unit purifies the target fluid by substituting the impurity anion contained in the target fluid with a hydroxide ion and substituting the impurity cation contained in the target fluid with a hydrogen ion.

11. The fluid-quality control apparatus according to claim 8, wherein
the electrolyte solutionizing unit includes
- an OH⁻type anion exchange resin column that substitutes the impurity anion contained in the target fluid with a hydroxide ion; and
- a cation exchange resin column that substitutes the impurity cation contained in the target fluid with either one of an alkali metal ion and an alkaline-earth metal ion, and the purifying unit includes
- an OH⁻type anion exchange resin column that substitutes the impurity anion contained in the target fluid with a hydroxide ion; and
- a H⁺type cation exchange resin column that substitutes the impurity cation contained in the target fluid with a hydrogen ion.

12. The fluid-quality control apparatus according to claim 11, wherein
the electrolyte solutionizing unit and the purifying unit share a single OH–type anion exchange resin column.

13. The fluid-quality control apparatus according to claim 8, wherein
the first target-fluid supply unit includes
- a first supply unit that supplies the target fluid to the electrolyte solutionizing unit; and
- a second supply unit that supplies the target fluid to the purifying unit.

14. The fluid-quality control apparatus according to claim 8, wherein
the first target-fluid supply unit includes
- a channel switching unit that selectively switches over a fluid channel of the target fluid between the electrolyte solutionizing unit and the purifying unit; and
- a pump that supplies the target fluid to the channel switching unit.

15. The fluid-quality control apparatus according to claim 8, wherein
the fluid-quality control unit controls the operation of the first target-fluid supply unit so that the pH value of the target fluid falls within a range between 8.5 and 10.5.

16. The fluid-quality control apparatus according to claim 15, wherein
the fluid-quality control unit controls the operation of the first target-fluid supply unit to supply the target fluid to the electrolyte solutionizing unit when the pH value measured by the fluid-quality measuring unit is lower than the first condition value, and controls the operation of the first target-fluid supply unit to supply the target fluid to the purifying unit when the pH value measured by the fluid-quality measuring unit is higher than the second condition value.

17. The fluid-quality control apparatus according to claim 15, further comprising:
an electrolytic-water producing unit that electrolyzes the target fluid to produce alkaline water and acidic water; and
a second target-fluid supply unit that supplies the target fluid to the electrolytic-water producing unit, wherein
the storing unit further stores a third condition value that is equal to or different from the first condition value, and
the control unit controls the electrolytic-water producing unit and the second target-fluid supply unit to operate when the pH value measured by the fluid-quality measuring unit is lower than the third condition value.

18. An electric-discharge machining apparatus comprising:
a machining apparatus main-body that machines a workpiece using electric discharge generated between a machining electrode and the workpiece by applying a high frequency pulsed voltage to the machining electrode and the workpiece while water-based machining fluid is interposed between the machining electrode and the workpiece;
a control apparatus that controls operation of the machining apparatus main-body;
a waste-fluid tank that stores used water-based machining fluid; and
a fluid-quality control apparatus that fabricates the water-based machining fluid for electric-discharge machining by controlling fluid quality of the used water-based machining fluid or undiluted fluid that is raw material for the water-based machining fluid, wherein
the fluid-quality control apparatus includes
a fluid-quality measuring unit that measures fluid-quality value of target fluid of which the fluid quality is to be controlled;
an electrolyte solutionizing unit that makes the target fluid into electrolyte solution with a correlation between pH and conductivity by substituting an impurity anion contained in the target fluid with a predetermined anion and substituting an impurity cation contained in the target fluid with a predetermined cation;
a purifying unit that purifies the target fluid;
a target-fluid supply unit that supplies the target fluid to either one of the electrolyte solutionizing unit and the purifying unit; and
a control unit that controls operation of the target-fluid supply unit based on the fluid quality value measured by the fluid-quality measuring unit, and
the control unit includes
a storing unit that stores a first condition value and a second condition value that is equal to or higher than the first condition value; and
a fluid-quality control unit that controls the operation of the target-fluid supply unit based on a magnitude relationship between the fluid quality value measured by the fluid-quality measuring unit and each of the first condition value and the second condition value.

19. The electric-discharge machining apparatus according to claim 18, wherein
the fluid-quality value is pH value of the target fluid.

20. The electric-discharge machining apparatus according to claim 19, wherein
the predetermined anion is a hydroxide ion, and
the predetermined cation is either one of an alkali metal ion and an alkaline-earth metal ion.

21. The electric-discharge machining apparatus according to claim 19, wherein
the purifying unit purifies the target fluid by substituting the impurity anion contained in the target fluid with a hydroxide ion and substituting the impurity cation contained in the target fluid with a hydrogen ion.

22. The electric-discharge machining apparatus according to claim 19, wherein
the fluid-quality control unit controls the operation of the target-fluid supply unit so that the pH value of the target fluid falls within a range between 8.5 and 10.5.

23. The electric-discharge machining apparatus according to claim 22, wherein
the fluid-quality control unit controls the operation of the target-fluid supply unit to supply the target fluid to the electrolyte solutionizing unit when the pH value measured by the fluid-quality measuring unit is lower than the first condition value, and controls the operation of the target-fluid supply unit to supply the target fluid to the purifying unit when the pH value measured by the fluid-quality measuring unit is higher than the second condition value.

* * * * *